(12) United States Patent
Ohtani et al.

(10) Patent No.: US 8,603,373 B2
(45) Date of Patent: *Dec. 10, 2013

(54) METHOD FOR PRODUCING PARTICLES, METHOD FOR PRODUCING TONER, AND APPARATUS FOR PRODUCING PARTICLES

(75) Inventors: Shinji Ohtani, Shizuoka (JP); Chiaki Tanaka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 205 days.

This patent is subject to a terminal disclaimer.

(21) Appl. No.: 13/285,410

(22) Filed: Oct. 31, 2011

(65) Prior Publication Data

US 2012/0112374 A1 May 10, 2012

(30) Foreign Application Priority Data

Nov. 4, 2010 (JP) ................. 2010-247532
Nov. 30, 2010 (JP) ................. 2010-267703

(51) Int. Cl.
*B29B 9/00* (2006.01)

(52) U.S. Cl.
USPC ......... 264/5; 264/9; 425/6; 425/7; 430/137.1; 430/137.18

(58) Field of Classification Search
None
See application file for complete search history.

(56) References Cited

U.S. PATENT DOCUMENTS

| 7,390,607 | B2 | 6/2008 | Tanaka et al. |
| 7,396,625 | B2 | 7/2008 | Tanaka et al. |
| 7,432,032 | B2 | 10/2008 | Tanaka et al. |
| 7,553,599 | B2 | 6/2009 | Ohtani |
| 7,709,175 | B2 | 5/2010 | Ohtani |
| 7,879,268 | B2 * | 2/2011 | Kinoshita et al. ............ 264/12 |
| 7,923,517 | B2 | 4/2011 | Yoshida et al. |
| 8,029,961 | B2 | 10/2011 | Kuramoto et al. |
| 8,034,521 | B2 | 10/2011 | Kuramoto et al. |
| 8,034,526 | B2 | 10/2011 | Watanabe et al. |
| 8,137,087 | B2 * | 3/2012 | Norikane et al. ............ 425/6 |
| 2001/0036586 | A1 * | 11/2001 | Adachi et al. ............ 430/110.1 |

(Continued)

FOREIGN PATENT DOCUMENTS

| CN | 101296709 A | 10/2008 |
| CN | 101693768 A | 4/2010 |

(Continued)

OTHER PUBLICATIONS

Chinese Office Action issued Oct. 9, 2012, in China Patent Application No. 201110351210.1 (with English translation).

(Continued)

*Primary Examiner* — Mary F Theisen
(74) *Attorney, Agent, or Firm* — Oblon, Spivak, McClelland, Maier & Neustadt, L.L.P.

(57) ABSTRACT

A method for producing particles, including: bringing a compressive fluid into contact with a pressure plastic material, so as to produce a melt of the pressure plastic material; and discharging the melt of the pressure plastic material by differential pressure to a space, so as to form particles, wherein the discharging includes at least one of (A) discharging the melt of the pressure plastic material while a compressive fluid is supplied to the melt of the pressure plastic material, and (B) discharging the melt of the pressure plastic material through one or more through-holes, to which vibration is applied, so as to change the shape of the melt of the pressure plastic material from a columnar shape, through the columnar shape with constrictions, into a particle shape.

6 Claims, 6 Drawing Sheets

(56) References Cited

U.S. PATENT DOCUMENTS

| | | |
|---|---|---|
| 2005/0277044 A1* | 12/2005 | Watanabe et al. .......... 430/109.3 |
| 2008/0063971 A1* | 3/2008 | Watanabe et al. .......... 430/110.4 |
| 2008/0227011 A1 | 9/2008 | Kuramoto et al. |
| 2008/0241727 A1 | 10/2008 | Norikane et al. |
| 2008/0248416 A1 | 10/2008 | Norikane et al. |
| 2008/0286679 A1 | 11/2008 | Norikane et al. |
| 2008/0286680 A1 | 11/2008 | Norikane et al. |
| 2008/0292985 A1 | 11/2008 | Suzuki et al. |
| 2009/0117486 A1 | 5/2009 | Watanabe et al. |
| 2009/0162770 A1 | 6/2009 | Sako et al. |
| 2009/0239170 A1 | 9/2009 | Honda et al. |
| 2009/0317735 A1 | 12/2009 | Ohtani et al. |
| 2009/0317738 A1 | 12/2009 | Honda et al. |
| 2009/0325100 A1 | 12/2009 | Watanabe et al. |
| 2010/0003613 A1 | 1/2010 | Honda et al. |
| 2010/0021209 A1 | 1/2010 | Watanabe et al. |
| 2010/0310982 A1 | 12/2010 | Ohtani et al. |

FOREIGN PATENT DOCUMENTS

| | | |
|---|---|---|
| CN | 101767080 A | 7/2010 |
| JP | 7-13756 | 1/1995 |
| JP | 4113452 | 4/2008 |
| JP | 2008-229462 | 10/2008 |
| JP | 2008-242416 | 10/2008 |
| JP | 4647506 | 12/2010 |

OTHER PUBLICATIONS

Chinese Office Action issued Jun. 21, 2013, in China Patent Application No. 201110351210.1 (with English translation).

* cited by examiner

METHOD FOR PRODUCING PARTICLES, METHOD FOR PRODUCING TONER, AND APPARATUS FOR PRODUCING PARTICLES

BACKGROUND OF THE INVENTION

1. Field of the Invention

The present invention relates to a method for producing particles using compressive fluid, a method for producing a toner, and an apparatus for producing particles.

2. Description of the Related Art

Conventionally, various products in the shape of particles are produced by processing resins, such as thermoplastic resins and thermosetting resins, depending on the properties thereof. For example, a toner used in an image forming apparatus is produced by heating a raw material containing a thermoplastic resin to a temperature equal to or higher than the glass transition temperature Tg thereof for plasticization, or to a temperature equal to or higher than a melting point thereof for melting, followed by forming the plasticized or melted raw material into particles.

Specifically, a kneaded product, which is produced by melting and kneading the raw material containing the thermoplastic resin, is cooled to be a solid, and then pulverized, to produce a toner in the form of particles (Japanese Patent (JP-B) No. 2677685). However, when the toner is produced by pulverization, it is difficult to control particle size. When fine powder is not sufficiently removed, the basic properties of the toner, such as charging ability, fixing ability, and heat resistant storage stability (change over time) are degraded.

It has been known that in order to control a toner particle shape, a material containing a thermoplastic resin is kneaded and pulverized, and then dispersed in an aqueous solvent in the presence of hydrophilic inorganic fine particles, followed by heating the mixture to remove the solvent, to thereby produce a toner in the shape of particles (Japanese Patent Application Laid-Open (JP-A) No. 09-34167). However, in this method, since the solvent is used, it is necessary to dry the solvent, and waste liquid is formed. Since in the kneading and pulverizing step, the thermoplastic resin is processed at high temperature and with high shear, problems occur, such as color change, degradation of the above-described basic properties due to degradation of a resin, and the like.

Recently, a toner produced by Particles from Gas Saturated Solutions (PGSS) process has been proposed. The PGSS process is performed in such a manner that a thermoplastic resin is melted, and the compressive fluid is brought into contact with the melted thermoplastic resin, and then mixed using a static mixer, followed by decompressing and expanding the resultant mixture, to thereby produce a toner (JP-B No. 4113452). According to this process, since the compressive fluid is used, a toner can be produced without using a solvent, as well as with no need to pulverize the thermoplastic resin.

However, by the proposed PGSS process, the size of the resultant particles becomes large, i.e., several hundred micrometers to several millimeters. Moreover, particle size distribution becomes broad and nonuniform because of fibrous products and cohesion of toner particles. Thus, it is difficult to produce a large amount of uniform fine particles having small particle sizes. For example, in an application, which needs particles having narrow particle size distribution, such as an electrophotographic toner, classification is necessary, and yield is degraded. When a temperature of a mixture is increased, and the molecular weight of the thermoplastic resin as a raw material is decreased, in order to improve processability, there occur problems that the thermoplastic resin is degraded, causing degradation in the basic properties of the toner, such as charging stability.

SUMMARY OF THE INVENTION

An object of the present invention is to provide a method for producing particles, a method for producing a toner, and an apparatus for producing particles, in which a raw material is less degraded, since the first compressive fluid is brought into contact with a pressure plastic material, so as to produce a melt of the pressure plastic material, and then the melt of the pressure plastic material is jetted while the second compressive fluid is supplied to the melt of the pressure plastic material, to thereby form particles, as a result, particles can be formed at a low temperature, compared to particles formed by plasticization by heat at normal temperature, or by PGSS method.

Another object of the present invention is to provide a method for producing particles, a method for producing a toner, and an apparatus for producing particles, which can obtain particles controlled to have narrow particle size, since particles can be formed from the fine particle-shaped melts of a pressure plastic material, by bringing the compressive fluid into contact with the pressure plastic material, so as to produce a melt of the pressure plastic material, followed by discharging the melt of the pressure plastic material through a through-hole, to which vibration is applied, by means of differential pressure, so as to change the shape of the melt of the pressure plastic material from a columnar shape, through the columnar shape with constrictions, into a particle shape.

Means for solving problems are as follows.

<1> A method for producing particles, including: bringing a compressive fluid into contact with a pressure plastic material, so as to produce a melt of the pressure plastic material; and discharging the melt of the pressure plastic material by differential pressure to a space, so as to form particles, wherein the discharging includes at least one of (A) discharging the melt of the pressure plastic material while a compressive fluid is supplied to the melt of the pressure plastic material, and (B) discharging the melt of the pressure plastic material through one or more through-holes, to which vibration is applied, so as to change the shape of the melt of the pressure plastic material from a columnar shape, through the columnar shape with constrictions, into a particle shape.

<2> The method for producing particles according to <1>, wherein the melt has a viscosity of 20 mPa·s or lower.

<3> The method for producing particles according to <1>, wherein the pressure plastic material is at least one selected from a group consisting of a polyester resin, a vinyl resin, and a urethane resin.

<4> The method for producing particles according to <1>, wherein the compressive fluid contains any one of supercritical carbon dioxide and liquefied carbon dioxide.

<5> The method for producing particles according to claim 1, wherein the particles are toner particles.

<6> Particles obtained by a method for producing particles, the method containing: bringing a compressive fluid into contact with a pressure plastic material, so as to produce a melt of the pressure plastic material; and discharging the melt of the pressure plastic material by differential pressure to a space, so as to form particles, wherein the discharging contains at least one of (A) discharging the melt of the pressure plastic material while a compressive fluid is supplied to the melt of the pressure plastic material, and (B) discharging the melt of the pressure plastic material through one or more through-holes, to which vibration is applied, so as to change the shape of the melt of the pressure plastic material from a columnar shape, through the columnar shape with constrictions, into a particle shape, and wherein the particles substantially contain no organic solvent.

<A1> A method for producing particles including: bringing a first compressive fluid to a pressure plastic material, so as to produce a melt of the pressure plastic material; and jetting the melt of the pressure plastic material to form particles, while a second compressive fluid is supplied to the melt of the pressure plastic material.

<A2> The method for producing a toner including: bringing a first compressive fluid to a toner material containing a pressure plastic material, so as to produce a melt of the toner material; and jetting the melt of the toner material to form particles, while a second compressive fluid is supplied to the melt of the toner material.

<A3> The method for producing a toner according to <A2>, wherein the melt of the toner material has a viscosity of 20 mPa·s or lower.

<A4> The method for producing a toner according to any one of <A2> and <A3>, wherein the pressure plastic material is at least one selected from a group consisting of a polyester resin, a vinyl resin, and a urethane resin.

<A5> The method for producing a toner according to any one of <A2> to <A4>, wherein the first compressive fluid and the second compressive fluid contain any one of supercritical carbon dioxide and liquefied carbon dioxide.

<A6> A toner produced by the method for producing a toner according to any one of <A2> to <A5>.

<A7> The toner according to <A6>, wherein the toner substantially contains no organic solvent.

<A8> A developer containing the toner according to any one of <A6> and <A7>.

<A9> A process cartridge including a latent electrostatic image bearing member, and a developing unit configured to develop a latent electrostatic image on the latent electrostatic image bearing member using the toner according to any one of <A6> and <A7>, so as to form a visible image, wherein the process cartridge is detachably attached to a main body of an image forming apparatus.

<A10> An image forming method including forming a latent electrostatic image on a latent electrostatic image bearing member, and developing the latent electrostatic image using the toner according to any one of <A6> and <A7> so as to form a visible image, transferring the visible image to a recording medium, and fixing the transferred visible image on the recording medium.

<A11> An image forming apparatus including a latent electrostatic image bearing member, a latent electrostatic image forming unit configured to form a latent electrostatic image on the latent electrostatic image bearing member, a developing unit configured to develop the latent electrostatic image so as to form a visible image using the toner according to any one of <A6> and <A7>, a transferring unit configured to transfer the visible image onto a recording medium, and a fixing unit configured to fix the transferred visible image on the recording medium.

<A12> An apparatus for producing particles including: a first fluid supply unit configured to supply a first compressive fluid; a melt tank, in which the first compressive fluid supplied from the first fluid supply unit is brought into contact with a pressure plastic material, so as to produce a melt of the pressure plastic material, a second fluid supply unit configured to supply a second compressive fluid, and a discharging unit configured to discharge the melt of the pressure plastic with the second compressive fluid supplied from the second fluid supply unit.

<B1> A method for producing particles including bringing a compressive fluid into contact with a pressure plastic material, so as to produce a melt of the pressure plastic, and discharging the melt of the pressure plastic material through a through-hole, to which vibration is applied, by means of differential pressure, so as to change the shape of the melt of the pressure plastic material from a columnar shape, through the columnar shape with constrictions, into a particle shape.

<B2> A method for producing a toner including bringing a compressive fluid into contact with a toner material containing a pressure plastic material, so as to produce a melt of the toner material, and discharging the melt of the toner material through a through-hole, to which vibration is applied, by means of differential pressure, so as to change the shape of the melt the toner material from a columnar shape, through the columnar shape with constrictions, into a particle shape.

<B3> The method for producing a toner according to <B2>, wherein the pressure plastic material is at least one selected from a group consisting of a polyester resin, a vinyl resin, and a urethane resin.

<B4> The method for producing a toner according to any one of <B2> and <B3>, wherein the compressive fluid contains any one of supercritical carbon dioxide and liquefied carbon dioxide.

<B5> Particles produced by the method for producing particles according to <B1>.

<B6> The toner produced by the method for producing a toner according to any one of <B2> to <B4>.

<B7> The toner according to <B6>, wherein the toner substantially contains no organic solvent.

<B8> A developer containing the toner according to any one of <B6> and <B7>.

<B9> A process cartridge including a latent electrostatic image bearing member, and a developing unit configured to develop a latent electrostatic image on the latent electrostatic image bearing member using the toner according to any one of <B6> and <B7>, so as to form a visible image, wherein the process cartridge is detachably attached to a main body of an image forming apparatus.

<B10> An image forming method including forming a latent electrostatic image on a latent electrostatic image bearing member, and developing the latent electrostatic image using the toner according to any one of <B6> and <B7> so as to form a visible image, transferring the visible image to a recording medium, and fixing the transferred visible image on the image recording medium.

<B11> An image forming apparatus including a latent electrostatic image bearing member, a latent electrostatic image forming unit configured to form a latent electrostatic image on the latent electrostatic image bearing member, a developing unit configured to develop the latent electrostatic image so as to form a visible image using the toner according to any one of <B6> and <B7>, a transferring unit configured to transfer the visible image onto a recording medium, and a fixing unit configured to fix the transferred visible image on the recording medium.

<B12> An apparatus for producing particles including: a discharging unit configured to discharge a melt of a pressure plastic material, which is produced by brining a compressive fluid into contact with the pressure plastic material; and a particle shape forming section having a space, in which the melt of a pressure plastic material discharged from the discharging unit is formed into particles, wherein the discharging unit includes at least a reservoir for containing the melt of the pressure plastic, one or more through-holes formed in a part of a wall of the reservoir, and a vibration unit arranged to be in contact with the reservoir so as to apply vibration to the one or more through-holes, and wherein the particle shape forming section includes a pressure control unit configured to control the difference between the pressure of the space and the internal pressure of the reservoir, so as to change the shape of the melt of the pressure plastic material discharged through the one or more through-holes from a columnar shape, through the columnar shape with constrictions, into a particle shape.

The present invention can provide a method for producing particles, a method for producing a toner, and an apparatus for producing particles, in which a raw material is less degraded, since the first compressive fluid is brought into contact with a pressure plastic material, so as to produce a melt of the pressure plastic material, and then the melt of the pressure plastic material is jetted while the second compressive fluid is supplied to the melt of the pressure plastic material, to thereby form particles, as a result, particles can be formed at a low temperature, compared to particles formed by plasticization by heat at normal temperature, or by PGSS method.

Moreover, the present invention can provide a method for producing particles, a method for producing a toner, and an apparatus for producing particles, which can obtain particles controlled to have narrow particle size, since particles can be formed from the fine particle-shaped melts of a pressure plastic material, by bringing the compressive fluid into contact with the pressure plastic material, so as to produce a melt of the pressure plastic material, followed by discharging the melt of the pressure plastic material through a through-hole, to which vibration is applied, by means of differential pressure, so as to change the shape of the melt of the pressure plastic material from a columnar shape, through the columnar shape with constrictions, into a particle shape.

DETAILED DESCRIPTION OF THE INVENTION (Method and Apparatus for Producing Particles)

A method for producing particles of the present invention includes a melting step and a particle forming step, and if necessary further includes other steps.

The apparatus for producing particles of the present invention includes at least a particle forming unit, and if necessary further includes other units.

The apparatus for producing particles, includes a particle forming unit configured to discharge a melt of a pressure plastic material, which is produced by brining a compressive fluid into contact with the pressure plastic material, by differential pressure to a space, so as to form particles, wherein the particle forming unit contains at least one of:

(A) a discharging unit configured to discharge the melt of the pressure plastic material while a compressive fluid is supplied to the melt of the pressure plastic material; and (B) a reservoir for containing the melt of the pressure plastic material, one or more through-holes formed in a part of a wall of the reservoir, and a vibration unit arranged to be in contact with the reservoir so as to apply vibration to the one or more through-holes.

The shape, size, and material of the particles produced by the method and apparatus of producing particles of the present invention are not particularly limited and may be appropriately selected depending on the intended purpose. Examples of the particles include toner particles.

<Raw Material>

Firstly, materials, such as a pressure plastic material, which is a raw material for the particles produced by the method for producing the particles of the present invention, will be described.

<Pressure Plastic Material>

In the present invention, a pressure plastic material means a material having properties that a glass transition temperature thereof decreases by application of pressure, and specifically, a material which is plasticized only by application of pressure, without heating. For example, the pressure plastic material is brought into contact with a compressive fluid so as to apply pressure, and then plasticized at a temperature lower than the glass transition temperature Tg of the pressure plastic material at atmospheric pressure.

Figure 1:
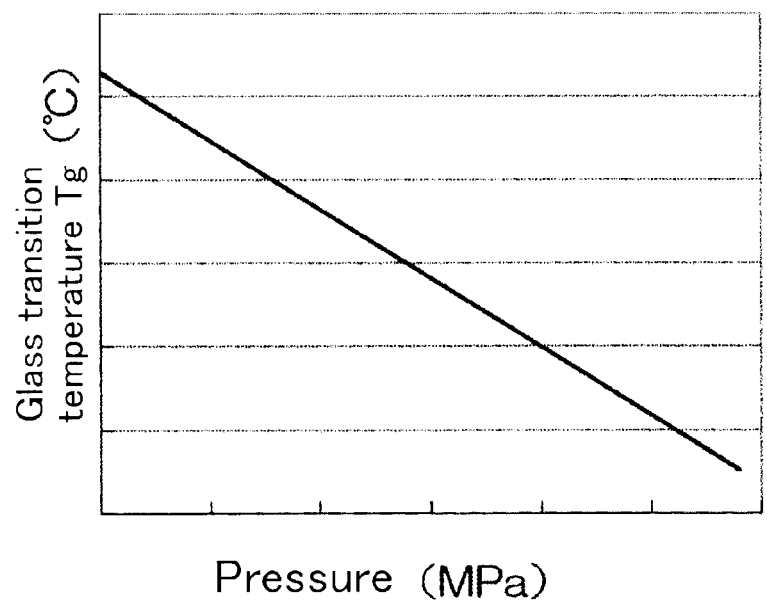
FIG. 1 is a graph showing a relation between the glass transition temperature of polyethylene and a pressure in the presence of carbon dioxide as a compressive fluid.

The pressure plastic material will be specifically described with reference to the drawings. FIG. 1 is a graph showing the relation between a glass transition temperature of polystyrene on the vertical axis and a pressure applied to carbon dioxide, which is compressive fluid, on the horizontal axis. As shown in FIG. 1, there is a correlation between the glass transition temperature of the polystyrene and a pressure applied to carbon dioxide, and the graph shows a negative inclination. Regarding the other materials, a graph of each of the materials showing the relation between the glass transition temperature thereof and a pressure can be formed in the same manner as the polystyrene, and when the graph of the material shows a negative inclination, it can be said that this material is a pressure plastic material. The inclination varies depending on the type, composition, molecular weight of the pressure plastic material. For example, when the pressure plastic material is a polystyrene resin, the inclination is −9° C./MPa; when the pressure plastic material is a styrene-acrylic resin, the inclination is −9° C./MPa, and when the pressure plastic material is an amorphous polyester resin, the inclination is −8° C./MPa, when the pressure plastic material is a crystalline polyester resin, the inclination is −2° C./MPa, when the pressure plastic material is a polyol resin, the inclination is −8° C./MPa, when the pressure plastic material is a polyurethane resin, the inclination is −7° C./MPa, when the pressure plastic material is a polyarylate resin, the inclination is −11° C./MPa, and when the pressure plastic material is a polycarbonate resin, the inclination is −10° C./MPa. The inclination is preferably −1° C./MPa or less, more preferably −5° C./MPa or less. There is no lower limit of the inclination. When the inclination is larger than −1° C./MPa, even though pressure is applied, the pressure plastic material is not sufficiently plasticized, and cannot obtain low viscosity. Thus, particles cannot be produced in some cases.

The pressure plastic material is not particularly limited and may be appropriately selected depending on the intended purpose. Examples of the pressure plastic material include polyester resins, vinyl resins, urethane resins, polyol resins, polyamide resins, epoxy resins, rosins, modified rosins, terpene resins, phenol resins, aliphatic or alicyclic hydrocarbon resins, aromatic petroleum resins, chlorinated paraffin and paraffin wax, polyethylenes, and polypropylenes. These may be used alone or in combination. Of these, polyester resins, polyol resins, vinyl resins are particularly preferable.

As the polyol resins, polyether polyol resins having epoxy skeletons are used, and preferable examples thereof include (i) an epoxy resin, (ii) an alkylene oxide adduct of divalent phenol or glycidyl ether thereof, and (iii) a polyol obtained form a reaction of a compound having an active hydrogen reacting with an epoxy group. The polyester resins are not particularly limited and may be appropriately selected depending on the intended purpose. Examples thereof include modified polyesters, unmodified polyesters, amorphous polyesters, and crystalline polyesters.

The vinyl resins are not particularly limited and may be appropriately selected depending on the intended purpose. Examples thereof include polymers, copolymers, and mixtures thereof, such as styrene and polymers of substitution product thereof, for example, polystyrene, poly(p-chlorostyrene), and polyvinyltoluene; styrene copolymers, for example, a styrene-p-chlorostyrene copolymer, a styrene-propylene copolymer, a styrene-vinyltoluene copolymer, a styrene-vinylnaphthalene copolymer, a styrene-methyl acrylate copolymer, a styrene-ethyl acrylate copolymer, a styrene-butyl acrylate copolymer, a styrene-octyl acrylate copolymer, a styrene-methyl methacrylate copolymer, a styrene-ethyl methacrylate copolymer, a styrene-butyl methacrylate copolymer, a styrene-α-chloromethyl methacrylate copolymer, a styrene-acrylonitrile copolymer, a styrene-vinylmethylketone copolymer, a styrene-butadiene copolymer, a styrene-isoprene copolymer, a styrene-acrylonitrile-indene copolymer, a styrene-maleic acid copolymer, and a styrene-maleic acid ester copolymer; polymethyl methacrylate, polybutyl methacrylate, polyvinyl chloride, polyvinyl acetate, vinyl propionate, (meth)acrylamide, vinyl methyl ether, vinyl ethyl ether, vinyl isobutyl ether, vinyl methyl ketone, N-vinyl pyrrolidone, N-vinyl pyridine, and butadiene.

The urethane resin is not particularly limited and may be appropriately selected depending on the intended purpose.

When particles produced by the method for producing particles of the present invention are toner particles, a toner material, such as a colorant, a surfactant, a dispersant, a releasing agent, a charge controlling agent, and a crystalline polyester resin other than the pressure plastic material may be used, in addition to the pressure plastic material. Hereinafter, such toner material will be described.

<Colorant>

The colorants is not particularly limited and may be appropriately selected from known dyes and pigments depending on the intended purpose. Examples thereof include carbon blacks, nigrosine dyes, iron black, Naphthol Yellow S, Hansa Yellow (10G, 5G, G), cadmium yellow, yellow iron oxide, yellow ocher, chrome yellow, Titan Yellow, Polyazo Yellow, Oil Yellow, Hansa Yellow (GR, A, RN, R), Pigment Yellow L, Benzidine Yellow (G, GR), Permanent Yellow (NCG), Vulcan Fast Yellow (5G, R), Tartrazine Lake, Quinoline Yellow Lake, anthracene yellow BGL, isoindolinone yellow, colcothar, red lead oxide, lead red, cadmium red, cadmium mercury red, antimony red, Permanent Red 4R, Para Red, Fiser Red, parachloroorthonitroaniline red, Lithol Fast Scarlet G, Brilliant Fast Scarlet, Brilliant Carmine BS, Permanent Red (F2R, F4R, FRL, FRLL, is F4RH), Fast Scarlet VD, Vulcan Fast Rubine B, Brilliant Scarlet G, Lithol Rubine GX, Permanent Red FSR, Brilliant Carmine 6B, Pigment Scarlet 3B, Bordeaux 5B, Toluidine Maroon, Permanent Bordeaux F2K, Helio bordeaux BL, bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, victoria blue lake, metal-free phthalocyanine blue, phthalocyanine blue, fast sky blue, indanthrene blue (RS, BC), indigo, ultramarine blue, iron blue, anthraquinone blue, fast violet B, methylviolet lake, cobalt purple, manganese violet, dioxane violet, anthraquinone violet, chrome green, zinc green, chromium oxide, viridian green, emerald green, pigment green B, naphthol green B, green gold, acid green lake, malachite green lake, phthalocyanine green, anthraquinone green, titanium oxide, zinc flower, lithopone, and the like. These may be used alone or in combination.

The dyes are not particularly limited and may be appropriately selected depending on the intended purpose. Examples thereof include C.I. SOLVENT YELLOW (6, 9, 17, 31, 35, 100, 102, 103, 105), C.I. SOLVENT ORANGE (2, 7, 13, 14, 66), C.I. SOLVENT RED (5, 16, 17, 18, 19, 22, 23, 143. 145, 146, 149, 150, 151, 157, 158), C.I. SOLVENT VIOLET (31, 32, 33, 37), C.I. SOLVENT BLUE (22, 63, 78, 83 to 86, 191, 194, 195, 104, C.I. SOLVENT GREEN (24, 25), C.I. SOLVENT BROWN (3, 9). Commercially available dyes are not particularly limited and may be appropriately selected depending on the intended purpose. Examples thereof include Aizen SOT dyes such as Yellow-1,3,4, Orange-1,2,3, Scarlet-1, Red-1,2,3, Brown-2, Blue-1,2, Violet-1, Green-1, 2,3, and Black-1,4,6,8 (manufactured by Hodogaya Chemical Co., Ltd.); Sudan dyes such as Yellow-146, 150, Orange-220, Red-290, 380, 460, and Blue-670 (manufactured by BASF); Diaresin Yellow-3G, F, H2G, HG, HC, HL, Diaresin Orange-HS, G, Diaresin Red-GG, S, HS, A, K, H5B, Diaresin Violet-D, Diaresin Blue-J, G, N, K, P, H3G, 4G, Diaresin Green-C, and Diaresin Brown-A (manufactured by Mitsubishi Chemical Industries. Ltd.); Oil Color Yellow-3G, GG-S, #105, Oil Color Orange-PS, PR, #201, Oil Color Scarlet-#308, Oil Color Red-5B, Oil Color Brown-GR, #416, Oil Color Green-BG, #502, Oil Color Blue-BOS, IIN, and Oil Color Black-HBB, #803, EB, EX (manufactured by Orient Chemical Industries, Ltd.); Sumiplast Blue-GP, OR, Sumiplast Red-FB, 3B, and Sumiplast Yellow FL7G, GC (manufactured by Sumitomo Chemical Co., Ltd.); and Kayaron Polyester Black EX-SF300, Kayaset Red-B, and Kayaset Blue-A-2R (manufactured by Nippon Kayaku Co., Ltd).

The amount of the colorant is not particularly limited and may be appropriately selected depending on a coloring degree. It is preferably 1 part by mass to 50 parts by mass, relative to 100 parts by mass of the pressure plastic material.

<Surfactant>

Examples of the surfactants include fluorochemical surfactants, silicone surfactants, and polyethylene glycol (PEG)

surfactants. These are compounds each contain at least a perfluoroalkyl group (Rf group), a polydimethylsiloxane group (PDMS group), a polyethylene glycol group (PEG group) or the like in a main chain or a side chain. These may be in a form of oligomer or polymer.

Specific examples of the surfactants include homopolymers obtained by polymerization of a Rf group-containing vinyl monomer, a PDMS group-containing vinyl monomer, a PEG group-containing vinyl monomer, etc.; copolymers of the aforementioned vinyl monomer and the other vinyl monomer. Examples of the vinyl monomers include styrene monomers, acrylate monomers, and methacrylate monomers.

Moreover, the surfactant having a Rf group, a PDMS group, and a PEG group as a main chain of an oligomer or a polymer, in which a COOH group, an OH group, an amino group, or a pyrrolidone skeleton is introduced into a side chain, may be used. However, the surfactants are not limited thereto. There are many commercially available vinyl monomers, and these may be used depending on the intended purpose.

An example of the fluorochemical surfactant is represented by the following General Formula 1.

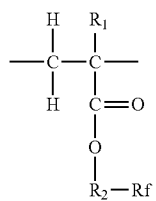

General Formula 1

In General Formula 1, $R_1$ denotes a hydrogen atom, a methyl group, or a lower alkyl group having 2 to 4 carbon atoms (such as an ethyl group, a propyl group, an isopropyl group, a n-butyl group, a sec-butyl group, a tert-group, and the like); $R_2$ denotes a methylene group, an ethylene group, or a substituted or unsubstituted alkylene group (such as a propylene group, an isoprene group, a 2-hydroxypropyl group, a butylene group, a 2-hydroxybutylene group and the like); Rf denotes a perfluoroalkyl group having 7 to 10 carbon atoms, a perfluoroalkyl group having 1 to 6 carbon atoms, or a perfluoroalkyl group having 11 to 20 carbon atoms. Of these, it is preferred that $R_1$ denote a hydrogen atom or a methyl group; that $R_2$ denote a methylene group or an ethylene group; and that Rf denote a perfluoroalkyl group having 7 to 10 carbon atoms.

These fluorine group-containing surfactants are produced in such a manner that a fluorine vinyl monomer is polymerized in a fluorine solvent such as HCFC225. However, it is more preferred that instead of HCFC225, a supercritical carbon dioxide be used as a reaction solvent for synthesizing the fluorine group-containing surfactant, in terms of reducing an environmental load. Specifically, a method described in "Handbook of fluororesin" (edited by Takaomi Satokawa, published by Nikkan Kogyo Shimbun Ltd.) pp. 730 to 732, may be used.

<Dispersant>

The dispersant is not particularly limited and may be appropriately selected depending on the intended purpose. Examples thereof include organic fine particles and inorganic fine particles. Of these, acrylic-modified inorganic fine particles, silicone-modified inorganic fine particles, fluorine-modified inorganic fine particles, fluorine-containing organic fine particles, and silicone-containing organic fine particles are preferable. Of these, acrylic-modified inorganic fine particles are more preferable. The dispersant is preferably dissolved in the compressive fluid.

Examples of the organic fine particles include silicone-modified acrylic fine particles and fluorine-modified acrylic particles, which are insoluble in supercritical fluids. Exampled of the inorganic fine particles include polyvalent metal phosphates such as calcium phosphate, magnesium phosphate, aluminum phosphate, and zinc phosphate; carbonates such as calcium carbonate, and magnesium carbonate; inorganic salts such as calcium metasilicate, calcium sulfate, barium sulfate; inorganic oxides such as calcium hydroxide, magnesium hydroxide, aluminium hydroxide, silica, titanium oxide, bentonite, and alumina. Of these, silica is preferable.

As the exemplary acrylic-modified inorganic fine particles, there are surface modified inorganic fine particles obtained by modifying an OH group remaining on a surface of an inorganic fine particle with a fluorine atom-containing silane coupling agent. The reaction formula below shows that silica is subjected to surface modification using 3-(Trimethoxysil) propyl methacrylate. However, other methods may be used as long as these methods provide the acrylic-modified inorganic fine particles.

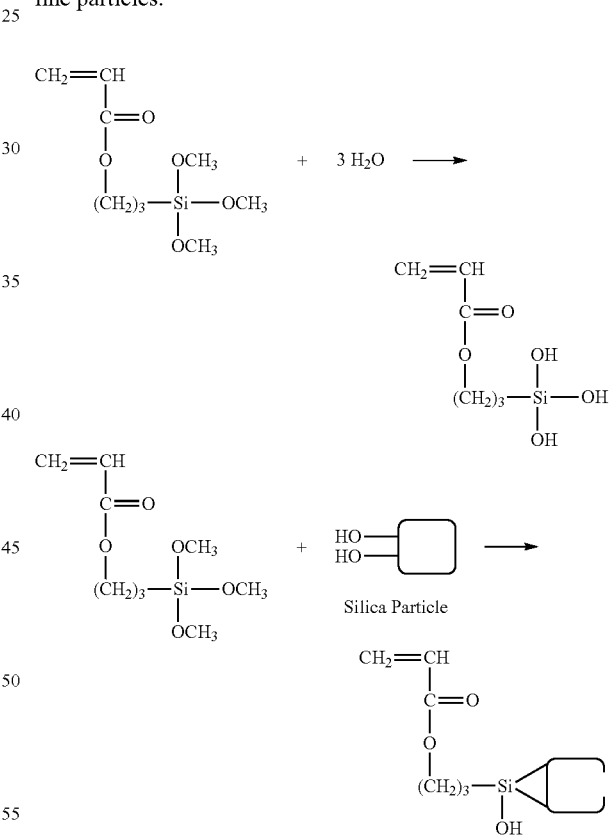

The acrylic-modified inorganic fine particles obtained by the above-described method have high affinity to supercritical carbon dioxide with its Si portion and high affinity to a toner material with its acrylate portion. Specific examples of the fluorine atom-containing silane coupling agents are shown below.

(1) $CF_3(CH_2)_2SiCl_3$
(2) $CF_3(CF_2)_5SiCl_3$
(3) $CF_3(CF_2)_5(CH_2)_2SiCl_3$
(4) $CF_3(CF_2)_7(CH_2)_2SiCl_3$ (5) $CF_3(CF_2)_7CH_2CH_2Si(OCH_3)_3$
(6) $CF_3(CF_2)_7(CH_2)_2Si(CH_3)Cl_2$
(7) $CF_3(CH_2)_2Si(OCH_3)_3$
(8) $CF_3(CH_2)_2Si(CH_3)(OCH_3)_2$
(9) $CF_3(CF_2)_3(CH_2)_2Si(OCH_3)_3$
(10) $CF_3(CF_2)_5CONH(CH_2)_2Si(OC_2H_5)_3$
(11) $CF_3(CF_2)_4COO(CH_2)_2Si(OCH_3)_3$
(12) $CF_3(CF_2)_7(CH_2)_2Si(OCH_3)_3$
(13) $CF_3(CF_2)_7(CH_2)_2Si(CH_3)(OCH_3)_2$
(14) $CF_3(CF_2)_7SO_2NH(CH_2)_3SKOC_2H_5)_3$
(15) $CF_3(CF_2)_8(CH_2)_2Si(OCH_3)_3$

The amount of the dispersant in the toner material is preferably 0.1% by mass to 30% by mass, and more preferably 0.2% by mass to 20% by mass. The dispersant is preferably used alone, but may be used in combination with a surfactant in light of controlling toner particle diameters and toner charging ability.

<Releasing Agent>

The releasing agent is not particularly limited and may be appropriately selected from those known in the art depending on the intended purpose. For example, waxes are suitably used. Examples of the waxes include low-molecular weight polyolefin waxes, synthesized hydrocarbon waxes, natural waxes, petroleum waxes, high fatty acids and metal salts thereof, high fatty acid amides, and modifications of these waxes. These may be used alone or in combination.

Examples of the low-molecular weight polyolefin waxes include low-molecular weight polyethylene waxes and low-molecular weight polypropylene waxes. Examples of the synthesized hydrocarbon waxes include Fischer-Tropsh wax. Examples of the natural waxes include bee waxes, carnauba waxes, candelilla waxes, rice waxes, and montan waxes. Examples of the petroleum waxes include paraffin waxes, and microcrystalline waxes. Examples of the high fatty acids include stearic acid, palmitic acid, and myristic acid.

The melting point of the releasing agent is not particularly limited and may be appropriately selected depending on the intended purpose. The melting point of the releasing agent is preferably 40° C. to 160° C., more preferably 50° C. to 120° C., and still more preferably 60° C. to 90° C. When the melting point of the releasing agent is lower than 40° C., the wax may adversely affect thermal stability. When the melting point of the releasing agent is higher than 160° C., it is likely that cold offset (in a heat roller fixation method, when a toner near the interface between the toner and paper cannot be sufficiently melted, a part of a toner image is removed by adhesive force with a fixation roller or electrostatic adsorption force. It is also called as low temperature offset.) may occur during a low-temperature fixing process, and a paper sheet may wind itself around the fixing device.

The amount of the releasing agent in the toner is not particularly limited and may be appropriately selected depending on the intended purpose. It is preferably 1 part by mass to 20 parts by mass, and more preferably 3 parts by mass to 15 parts by mass, relative to 100 parts by mass of the pressure plastic material.

<Charge Controlling Agent>

The charge controlling agent is not particularly limited and may be appropriately selected from those known in the art. However, when a coloring material is used for the charge controlling agent, the toner may show different tones of color and, therefore, colorless materials or materials having color close to white are preferably used. Examples of the charge controlling agents include nigrosine dyes, triphenylmethane dyes, chrome-containing metal complex dyes, molybdic acid chelate pigments, rhodamine dyes, alkoxy amines, quaternary ammonium salts (including fluoride-modified quaternary ammonium salts), alkylamides, phosphorus or compounds thereof, tungsten or compounds thereof, fluorine-containing surfactants, metal salts of salicylic acid, and metal salts of salicylic acid derivatives. Of these, metal salts of salicylic acid, and metal salts of salicylic acid derivatives are preferable. These may be used alone or in combination. The metals used for metal salts are not particularly limited and may be appropriately selected depending on the intended purpose. Examples of the metals include aluminum, zinc, titanium, strontium, boron, silicon, nickel, iron, chrome, and zirconium.

The charge control agent may be of commercially available ones. Specific examples thereof include quaternary ammonium salt BONTRON P-51, oxynaphthoic acid metal complex E-82, salicylic metal complex E-84, phenolic condensate E-89 (manufactured by Orient Chemical Industries Ltd.), molybdenum complex of quaternary ammonium salt TP-302 and TP-415, and metal complex of salicylic acid TN-105 (manufactured by Hodogaya Chemical Co., Ltd.), quaternary ammonium salt copy charge PSY VP2038, triphenylmethane derivatives copy blue PR, quaternary ammonium salt copy charge NEG VP2036, copy charge NX VP434 (manufactured by Hochst), LRA-901, boron complex LR-147 (manufactured by Japan Carlit Co., Ltd.), quinacridone, azo pigment, and high-molecular-weight-compounds having sulfonic acid group, carboxyl group, or quaternary ammonium salt group.

The amount of the charge controlling agent is not particularly limited and may be appropriately determined depending on the intended purpose. The amount of the charge controlling agent is preferably 0.5 parts by mass to 5 parts by mass and, more preferably 1 part by mass to 3 parts by mass, relative to 100 parts by mass of the pressure plastic material. When the amount is less than 0.5 parts by mass, the charging ability of the toner may be adversely affected. When the amount is more than 5 parts by mass, the charging ability of the toner becomes exceedingly enhanced, decreasing the effect of the charge controlling agent primarily used. Thus, an electrostatic suction force that presses toner against developing rollers increases, causing decrease in the flowability of the developer and image density.

<Crystalline Polyester Resin>

The crystalline polyester resin is not particularly limited and may be appropriately selected from those known in the art depending on the intended purpose. In view of the fact that a crystalline polyester resin having a sharp molecular weight distribution and having a low molecular weight is excellent in achieving low-temperature fixing ability, preferably the crystalline polyester resin has a peak in the range of 3.5 to 4.0 on a log (M) scale, the half width of the peak of 1.5 or shorter on a log (M) scale, a weight average molecular weight (Mw) of 1,000 to 30,000, a number average molecular weight (Mn) of 500 to 6,000, and a ratio Mw/Mn of 2 to 8, when a molecular weight distribution of the crystalline polyester resin is obtained by subjecting to GPC the fraction of the crystalline polyester resin soluble in o-dichlorobenzene for subsequent analysis and the molecular weight distribution is expressed as a graph where the horizontal axis is given on a log (M) scale and the vertical axis is given on a % by mass scale.

Preferably, the melting temperature and the $F_{1/2}$ temperature of the crystalline polyester resin is low, as long as the heat-resistant storage stability is not impaired, and more preferably the temperature of the endothermic peak measured by DSC is in the range of 50° C. to 150° C. The $F_{1/2}$ temperature is measured as follows. A sample with a volume of 1 cm$^2$ is melted and allowed to flow using a elevated flow tester CFT-500 (manufactured by Shimadzu Corporation) under the following conditions: diameter of die: 1 mm; pressure applied:

10 kg/cm², and temperature increase rate: 3° C./min. Then, the temperature, at which half of the amount of the sample that has flowed from the flow starting time to the flow ending time is considered to have flowed, is defined as the $F_{1/2}$ temperature of the sample. When the melting temperature and the $F_{1/2}$ temperature is lower than 50° C., the heat-resistant storage stability may be degraded, and blocking may readily occur even at a temperature of the inside of the developing device. When the melting temperature and the $F_{1/2}$ temperature is higher than 150° C., sufficient low-temperature fixing ability may not be obtained because the lower limit temperature for fixation becomes high.

An acid value of the crystalline polyester resin is not particularly limited, and may be appropriately selected depending on the intended purpose. It is preferably 5 mgKOH/g or more, and more preferably 10 mgKOH/g or more from the view point of increasing the affinity of the resin with paper and of achieving the intended low-temperature fixing ability. Moreover it is preferably 45 mgKOH/g or less from the view point of improving hot offset resistance. Furthermore, the hydroxyl value of the crystalline polyester resin is preferably 0 mgKOH/g to 50 mgKOH/g, and more preferably 5 mgKOH/g to 50 mgKOH/g in terms of the low-temperature fixing ability and charging ability.

The amount of the crystalline polyester resin is not particularly limited, and may be appropriately selected depending on the intended purpose. It is preferably 0 part by mass to 900 parts by mass or less, more preferably 0.5 parts by mass to 500 parts by mass, and particularly preferably 1 part by mass to 100 parts by mass, relative to 100 parts by mass of the pressure plastic material. When the amount of the crystalline polyester resin is less than 1 part by mass, the low temperature fixing ability may not exhibit. When the amount of the crystalline polyester resin is more than 900 parts by mass, hot offset resistance may be adversely affected.

<Other Components>

Examples of the other components, which can be used with the pressure plastic material, include a flowability improver and a cleaning improver. The flowability improver means an agent that improves hydrophobic properties of resin particles through surface treatment and is capable of preventing reduction of the flowability and/or charging ability of resin particles even when exposed to high humidity environment. Examples of the flowability improver include silane coupling agents, sililating agents, silane coupling agents having a fluorinated alkyl group, organotitanate coupling agents, aluminum-based coupling agents, silicone oils, and modified silicone oils.

The cleaning improver is added to the toner material to remove a developer remaining on a photoconductor (also referred to as a latent electrostatic image bearing member) and/or on a primary transferring medium after a primary transferring step. Examples of the cleaning improver include metal salts of fatty acid such as zinc stearate, calcium stearate, stearic acid, and polymer particles prepared by soap-free emulsion polymerization such as polymethylmethacrylate particles and polystyrene particles. Among these, polymer particles having a relatively narrow particle size distribution are preferable, and polymer particles having a volume average particle diameter of 0.01 μm to 1 μm are more preferable.

<Compressive Fluid>

Figure 2:
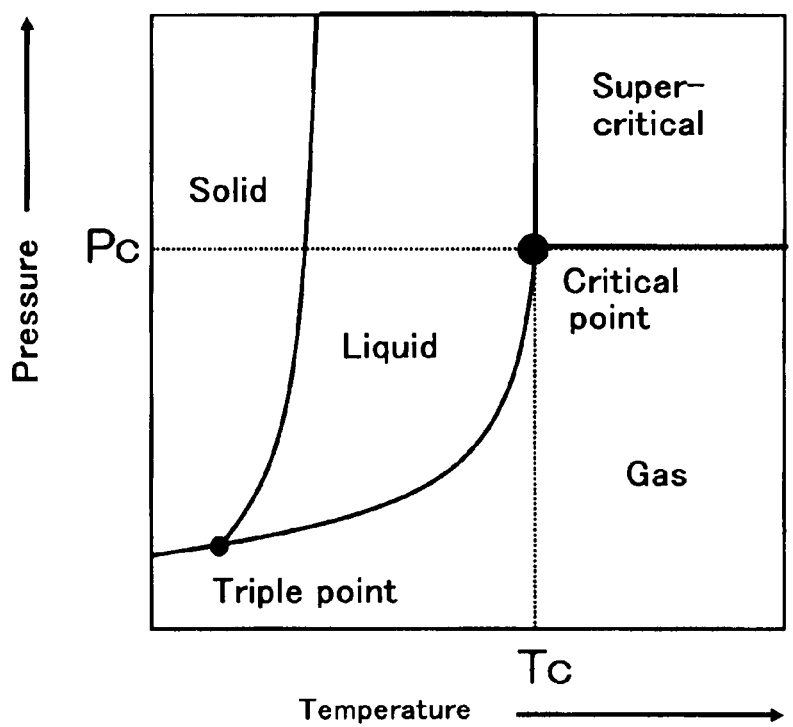
FIG. 2 is a general phase diagram showing the state of a substance varying depending on pressure and temperature conditions.
Figure 3:
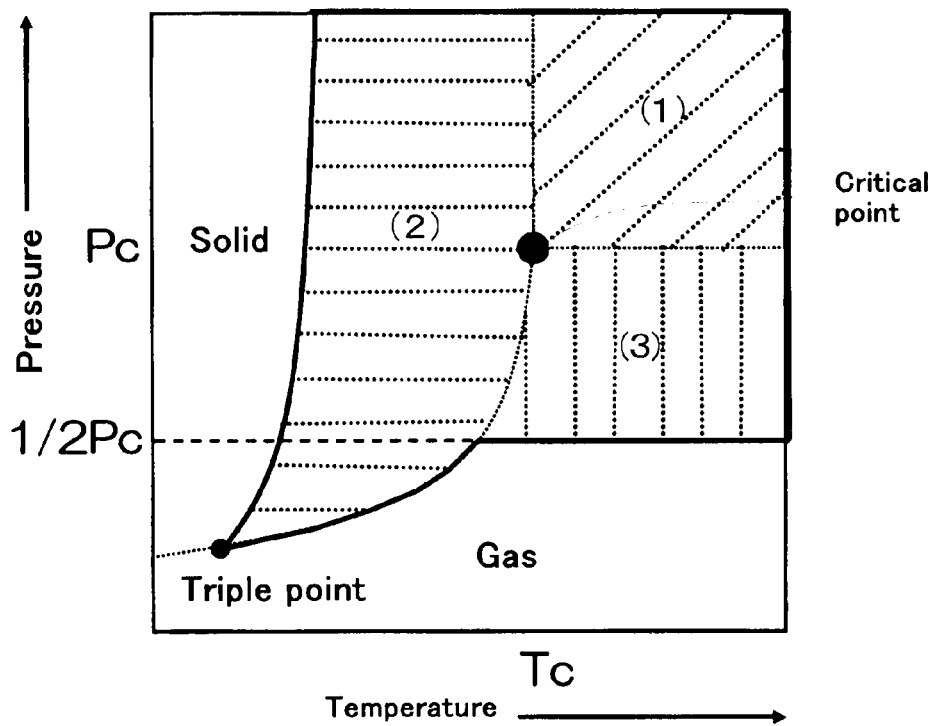
FIG. 3 is a phase diagram which defines a compressive fluid.

The compressive fluid used in the method for producing the particles of the present invention will be described with reference to FIGS. 2 and 3. FIG. 2 is a general phase diagram showing the state of a substance varying depending on pressure and temperature conditions. FIG. 3 is a phase diagram which defines a compressive fluid. In the present invention, the "compressive fluid" refers to a substance present in any one of the regions (1), (2) and (3) of FIG. 3 in the phase diagram of FIG. 2.

In FIGS. 2 and 3, Pc and Tc denote a critical pressure and a critical temperature, respectively.

In such regions, the substance is known to have extremely high density and show different behaviors from those shown at normal temperature and normal pressure. Notably, the substance present in the region (1) is a supercritical fluid. The supercritical fluid is a fluid that exists as a noncondensable high-density fluid at a temperature and a pressure exceeding the corresponding critical points, which are limiting points at which a gas and a liquid can coexist. Also, the supercritical fluid does not condense even when compressed, and exists at a critical temperature or higher and a critical pressure or higher. Also, the substance present in the region (2) is a liquid, but in the present invention, is a liquefied gas obtained by compressing a substance existing as a gas at normal temperature (25° C.) and normal pressure (1 atm). Further, the substance present in the region (3) is a gas, but in the present invention, is a high-pressure gas whose pressure is ½ Pc or higher. When carbon dioxide is used as the compressive fluid, the pressure is preferably 3.7 MPa or higher, more preferably 5 MPa or higher, still more preferably 7.4 MPa (critical pressure) or higher.

The compressive fluid is not particularly limited and may be appropriately selected depending on the intended purpose, as long as the substance is formed into fluid by applying a pressure. Examples thereof include supercritical fluid, subcritical fluid, and liquefied fluid. Specific examples thereof include supercritical carbon dioxide, subcritical carbon dioxide, liquefied carbon dioxide, methane, supercritical methane, ethane, supercritical ethane, supercritical propane, liquefied propane, propane, supercritical butane, liquefied butane, and butane. Of these, those containing carbon dioxide, such as supercritical carbon dioxide, subcritical carbon dioxide, and liquefied carbon dioxide are particularly preferable. Moreover, high-pressure gas or supercritical fluid obtained by mixing one or more of the above-mentioned compressive fluid may be used.

The supercritical fluid means a fluid that has intermediate properties between a gas and a liquid, has properties such as being fast in mass transfer and heat transfer and being low in viscosity, and can continuously greatly change the density, dielectric constant, solubility parameter, free volume, and the like by changing the temperature and pressure. Furthermore, the supercritical fluid can even follow a minute undulation (surface) to wet the surface with the supercritical fluid since it has an extremely small surface tension compared with those of organic solvents.

As the supercritical fluid, any supercritical fluid can be used without particular limitation as long as it is a fluid that exists as a noncondensable high-density fluid in a temperature and pressure region exceeding a limit (critical point) where a gas and a liquid can coexist, does not condensate when being compressed, and is in a state of a critical temperature or more and a critical pressure or more, and may be appropriately selected depending on the intended purpose. For example, a supercritical fluid having a low critical temperature and critical pressure is preferable. In addition, as the subcritical fluid, any subcritical fluid can be used without particular limitation as long as it exists as a high-pressure liquid and/or gas in a temperature and pressure region in the vicinity of the critical point, and may be appropriately selected depending on the intended purpose.

Examples of the supercritical fluid or subcritical fluid include carbon monoxide, carbon dioxide, nitrogen monoxide, ammonia, nitrogen, methane, ethane, propane, n-butane, isobutane, pentane, and chlorotrifluoromethane. Of these, carbon dioxide is particularly preferable since this can easily reach a supercritical state at a critical pressure of 7.3 MPa and a critical temperature of 31° C., is nonflammable and highly safe, allows to obtaining a toner having a hydrophobic surface as this is a nonaqueous solvent, and can be easily recovered and recycled as this is gasified by only restoring the pressure to a normal pressure, no drying is required for the resultant toner, and no liquid waste is produced and no residual monomer is contained therein.

For the supercritical fluid or the subcritical fluid, one of these may be used alone or two or more may be used in combination as a mixture. Moreover, organic solvent, such as alcohols (e.g., methanol, ethanol, propanol); ketones (e.g., acetone, methyl ethyl ketone); toluene, ethyl acetate, and tetrahydrofuran, may be added as an entrainer to the supercritical fluid or the subcritical fluid.

The liquefied fluid is not particularly limited and may be appropriately selected depending on the intended purpose. Examples thereof include liquefied carbon dioxide, liquefied methane, liquefied ethane, liquefied propane, and liquefied butane. Of these, liquefied carbon dioxide is preferable, because it is nonflammable and highly safe. The liquefied fluid may be used alone or in combination as a mixture.

The compressive fluid can be readily isolated from the target product and can be recycled for reuse. Thus, by using the compressive fluid, it is possible to realize an epoch-making, environment-friendly toner production process that eliminates the need to use water and/or organic solvents as required in conventional processes.

When particles produced by the method for producing the particles of the present invention are toner particles, the compressive fluid preferably contains a surfactant. The surfactant is not particularly limited and may be appropriately selected depending on the intended purpose, as long as it bears in a molecule moiety(s) that has an affinity to the compressive fluid and moiety(s) that has an affinity to the toner material. In a case of supercritical $CO_2$, for example, compounds having bulky groups (e.g., groups containing a fluorine atom, groups containing a silicon atom, carbonyl groups, short-chain hydrocarbon groups, and propylene oxide) are preferable because they act as compounds having an affinity to $CO_2$. Of these, fluorine-containing compounds, silicon-containing compounds, carbonyl group-containing compounds, and polyethylene glycol (PEG) group-containing compounds are particularly preferable.

The fluorine-containing compounds are not particularly limited as long as they are compounds containing a perfluoroalkyl group having 1 to 30 carbon atoms; they may be either low-molecular weight compounds or high-molecular weight compounds. Of these, high-molecular weight fluorine-containing compounds are preferable in terms of their excellent surfactant potency and of excellent charging ability and durability of resultant toner particles.

Examples of the high-molecular weight fluorine-containing compounds include those expressed by the following Structural Formulas (A) and (B). Note, however, that such compounds may be homopolymers, block copolymers, or random copolymers in view of the affinity to the toner material.

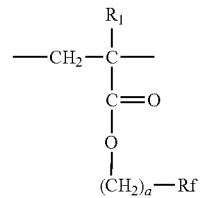

Structural Formula (A)

in Structural Formula (A), $R_1$ represents a hydrogen atom or a lower alkyl group having 1 to 4 carbon atoms, a represents an integer of 0 to 4, and Rf represents a perfluoroalkyl group having 1 to 30 carbon atoms or a perfluoroalkenyl group.

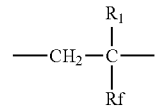

Structural Formula (B)

in Structural Formula (B), $R_1$ represents a hydrogen atom or a lower alkyl group having 1 to 4 carbon atoms, and Rf represents a perfluoroalkyl group having 1 to 30 carbon atoms or a perfluoroalkenyl group.

A number of chemical materials similar to the foregoing compounds containing a perfluoroalkyl group are commercially available (see catalogue by AZmax co.). Various fluorine-containing compounds can also be obtained using them.

The silicon-containing compounds are not particularly limited as long as they are compounds having a siloxane bond; they may be either low-molecular weight compounds or high-molecular weight compounds. Of these, compounds having a polydimethylsiloxane (PDMS) represented by the following Structural Formula (C) are preferable. Note, however, that such compounds may be homopolymers, block copolymers, or random copolymers in view of the affinity to the toner material.

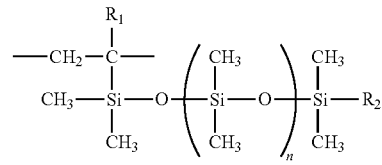

Structural Formula (C)

in Structural Formula (C), $R_1$ represents a hydrogen atom or a lower alkyl group having 1 to 4 carbon atoms, n represents a repeating unit, and $R_2$ represents a hydrogen atom, a hydroxyl group, or an alkyl group having 1 to 10 carbon atoms.

A number of chemical materials similar to the foregoing polydimethylsiloxanes are commercially available (see catalogue by AZmax co.). Various surfactants can also be obtained using them. Particularly, a silicon-containing compound (product name: Monasil PCA, manufactured by Croda International Plc) exhibits excellent granulating properties.

These fluorine-containing compounds and silicon-containing compounds can be produced by polymerization of polymerizable vinyl monomers that can be polymerized in a supercritical fluid (preferably supercritical carbon dioxide) in addition to conventional solvents.

The carbonyl group-containing compounds are not particularly limited and may be appropriately selected depending on the intended purpose. Examples thereof include aliphatic polyesters, polyacrylates and acrylic acid resins.

The polyethylene glycol (PEG) group-containing compounds are not particularly limited and may be appropriately selected depending on the intended purpose. Examples thereof include polyethylene glycol (PEG) group-containing polyacrylates, and polyethylene glycol resins.

The amount of the surfactant in the toner material is preferably 0.01% by mass to 30% by mass, and more preferably 0.1% by mass to 20% by mass.

When particles produced by the method for producing particles of the present invention are toner particles, additional fluids may be used together with the compressive fluid. For such additional fluids, those capable of facilitating control of the solubilities of the toner material are preferable. Suitable examples thereof include methane, ethane, propane, butane, and ethylene.

<Apparatus for Producing Particles of First Embodiment>

An apparatus for producing particles of the first embodiment including: a first fluid supply unit configured to supply a first compressive fluid; a melt tank, in which the first compressive fluid supplied from the first fluid supply unit is brought into contact with a pressure plastic material, so as to produce a melt of the pressure plastic material, a second fluid supply unit configured to supply a second compressive fluid, and a discharging unit configured to discharge the melt of the pressure plastic material with the second compressive fluid supplied from the second fluid supply unit, if necessary further includes other units.

As the first fluid supply unit configured to supply the first compressive fluid, for example, a pump and a valve are used.

As the melt tank, for example, a high pressure cell equipped with a thermostat is used.

As the second fluid supply unit configured to supply a second compressive fluid, for example, a pump and a valve are used.

As the discharging unit, for example, a nozzle is used.

Figure 4:
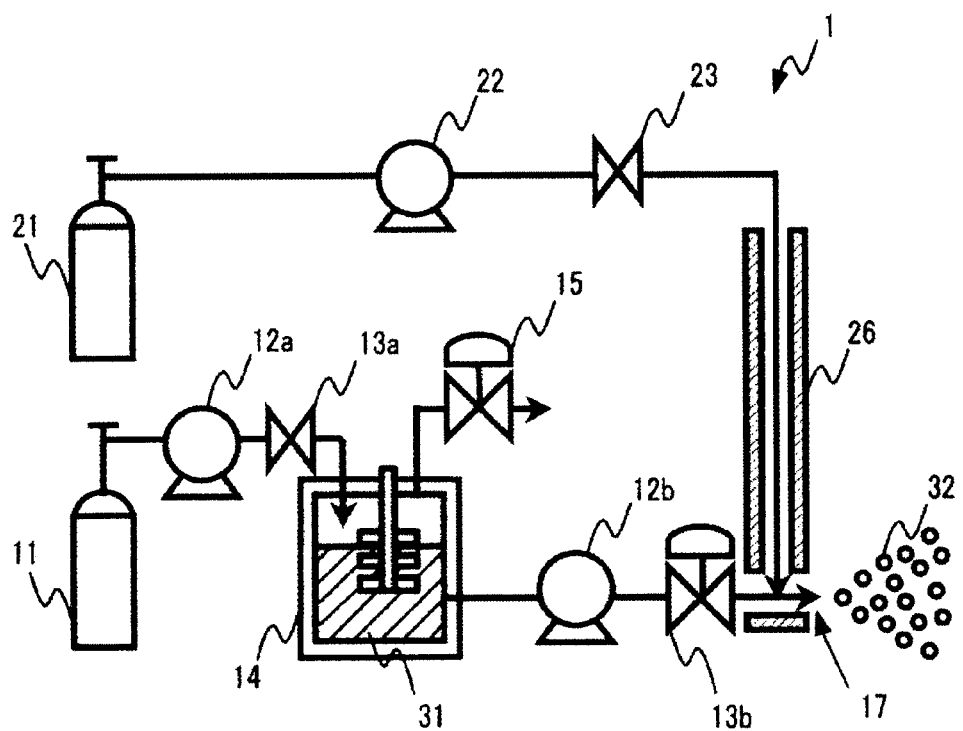
FIG. 4 is a schematic diagram showing an example of an apparatus for producing particles used in a method for producing particles of the present invention.

Next, an example of an apparatus for producing particles used in the method for producing particles of the present invention will be described. FIG. 4 is a schematic diagram showing an example of an apparatus 1 for producing particles used in a method for producing particles of the present invention. The apparatus 1 for producing particles includes: a bomb 11, pumps 12a, 12b, a valve 13a, a high pressure cell 14 equipped with a thermostat, a back pressure valve 15 and a nozzle 17, which are connected with a super high pressure pipe, etc. so as to form the first path; and a bomb 21, a pump 22, a valve 23 and a heater 26, which are connected with a super high pressure pipe, etc. so as to form the second path.

The bomb 11 arranged on the first path is a pressure resistant container for storing and supplying a substance (carbon dioxide, etc.) which will be a compressive fluid in the high pressure cell 14 equipped with a thermostat. The substance stored may be in the state of gas, liquid, or the like, as long as the substance is formed into a compressive fluid by controlling the temperature of the substance in the high pressure cell 14 equipped with a thermostat. As the substance stored in the bomb 11, air, nitrogen, and carbon dioxide are preferable, in terms of the cost and safety. Among these, carbon dioxide is more preferable. The pump 12a is a device of applying pressure to the substance stored in the bomb 11 so as to supply the substance from the bomb 11. The valve 13a is a device of opening or closing the path between the pump 12a and the high pressure cell 14 equipped with a thermostat, so as to adjust the flow rate of the substance, or to shut off the flow thereof.

The high pressure cell 14 equipped with a thermostat is a device of heating the substance supplied via the valve 13a so as to change it into a compressive fluid, and of bringing the compressive fluid into contact with a pressure plastic material which is separately supplied, so as to produce a melt of the pressure plastic material. The back pressure valve 15 is fixed to the high pressure cell 14 equipped with a thermostat, and is closed or opened to control the pressure in the high pressure cell 14 equipped with a thermostat. Moreover, a stirrer may be provided in the high pressure cell 14 equipped with a thermostat, to thereby stir and mix the compressive fluid and the plasticized pressure plastic material.

The pump 12b is a device of applying a pressure to the melt of the pressure plastic material in the high pressure cell 14 equipped with a thermostat, so as to supply the melt of the pressure plastic material therefrom. The valve 13b is a device of opening or closing the path between the pump 12b and the nozzle 17 so as to control the flow rate of the melt and to shut off the flow thereof. The nozzle 17 is a device of jetting the melt supplied from the first path and the substance supplied from the second path. The diameter of the nozzle 17 is not particularly limited as long as the pressure at the time of jetting can be constantly maintained. When the diameter of the nozzle 17 is excessively large, the pressure at the time of jetting excessively decreases, and the viscosity of the melt is increased, possibly causing difficulty in obtaining fine particles. In some cases, it is necessary to provide a large supply pump for maintaining the pressure. On the other hand, when the diameter of the nozzle is excessively small, the nozzle 17 is easily clogged with the melt, possibly causing difficulty in obtaining desired fine particles. The maximum value of the diameter of the nozzle is not particularly limited. The minimum value of the diameter thereof is preferably 5 μm or larger, more preferably 20 μm or larger, particularly preferably 50 μm or larger.

In the apparatus 1 for producing particles, the bomb 21 arranged on the second path is a pressure resistant container for storing and supplying a certain substance, such as gas, liquid, or the like. As the substance stored in the bomb 21, air, nitrogen, and carbon dioxide are preferable, in terms of cost and safety. Among these, carbon dioxide is more preferable. The pump 22 is a device of applying pressure to the substance stored in the bomb 21 so as to supply it from the bomb 21. The valve 23 is a device of opening or closing the path between the pump 22 and the heater 26, so as to adjust the flow rate of the substance, or to shut off the flow thereof. The heater 26 is a device of heating the substance supplied via the valve 23. The second path is connected through the heater 26 to the first path. The substance heated in the heater 26 and the melt of the pressure plastic material supplied from the first path are jetted from the nozzle to atmosphere. Since the substance heated in the heater 26 is cooled at the outlet of the heater 26 by Joule-Thompson effect, it is preferred that the substance be sufficiently heated to be in the supercritical fluid state.

<<Melting Step>>

A melting step of the method for producing particles of the present invention will be described. Here, the melting step will be described with an exemplary case using the apparatus 1 for producing particles shown in FIG. 4. The melting step of the method for producing particles of the present invention is a step of melting the first compressive fluid in a pressure plastic material, so as to produce a melt of the pressure plastic material. In the present invention, a "melt of the pressure plastic material" (also referred to as "melt") means the expanded, plasticized and liquefied state of the pressure plastic material formed by bringing the pressure plastic material into contact with the compressive fluid. Among rapid expansion processes, a target to be discharged used in a method known as the Rapid Expansion of Supercritical Solutions (RESS) process is formed by dissolving a material as a solute in a compressive fluid, and the fluid is uniformly compatible with the material. On the other hand, the melt of the pressure plastic material, which is a target to be discharged in the rapid expansion process (Particle from Gas Saturated Solutions (PGSS) process) of the present invention is, as described above, obtained by bringing the compressive fluid into contact with the pressure plastic material, followed by wetting, so as to decrease the viscosity of the pressure plastic material. Thus, there is an interface between the compressive fluid and the melt of the pressure plastic material. Namely, the target to be discharged in the former process is in the state of compressive fluid-solid phase equilibrium, on the other hand, the target to be discharged in the latter process is in the state of gas-liquid phase equilibrium. In the rapid expansion processes, the former and the latter are different in the phase state of the target to be discharged before expansion.

In the melting step, the pressure plastic material, and materials, such as a colorant when the particles to be produced are toner, are charged into the high pressure cell 14 equipped with a thermostat. In this case, when the materials of the particles include a plurality of materials, these materials may be preliminarily mixed with a mixer, etc., and then melted and kneaded with a roll mill, etc. Next, the high pressure cell 14 equipped with a thermostat is sealed, and then the materials are stirred, and the compressive fluid (the first compressive fluid, for example, carbon dioxide, etc.) supplied from the bomb 11 is pressurized with the pump 12*a* to supply it via the valve 13*a* to the high pressure cell 14 equipped with a thermostat. The temperature inside the high pressure cell 14 equipped with a thermostat is adjusted to a certain temperature with the thermostat. The pressure is adjusted to a certain pressured by adjusting the pump 12*a*, the back pressure valve 15, and the like. This allows the compressive fluid to be in contact with the toner material containing the pressure plastic material. In this case, the compressive fluid is melted in the pressure plastic material, so that the pressure plastic material has low viscosity. The stirring is carried out until the viscosity of the melt of the pressure plastic material becomes constant. The viscosity of the melt of the pressure plastic material or the melt of the toner material is not particularly limited, as long as it can be jetted from the nozzle 17. However, as the viscosity is low, it is easy to make fine particles upon jetting. Thus, the viscosity thereof is preferably 20 mPa·s or lower. When the viscosity of the melt is larger than 20 mPa·s, there is a possibility that particles are hard to be formed, that coarse particles and fibrous products are formed, and that foaming, and cohesion, etc. occur. When a final product is a toner, it may be difficult to produce required uniform fine particles each having a diameter of 4 µm to 8 µm.

A "melt of the toner material" means the state of the entirely melted toner material formed in such a manner that the pressure plastic material is brought into contact with the compressive fluid, so as to expand, plasticize and liquefy the pressure plastic material containing the toner material formed.

In the melting step of the method for producing particles of the present invention, the pressure to be applied to the compressive fluid is not particularly limited and may be suitably selected depending on the intended purpose. It is preferably 1 MPa or more, preferably 10 MPa to 200 MPa, particularly preferably 31 MPa to 100 MPa. When the pressure to be applied to the compressive fluid is less than 1 MPa, even though a resin is fluidized, the plasticizing effect enough to form particles may not be obtained. The maximum value of the pressure is not particularly limited, and high pressure causes no problem, but the higher the pressure is, the heavier an device becomes, causing increase in cost for equipments.

In the melting step of the method for producing particles in the present invention, a temperature for plasticizing the pressure plastic material is not particularly limited and may be appropriately selected depending on the intended purpose. It is preferably lower than or equal to a thermal decomposition temperature of the pressure plastic material in an atmospheric pressure, and more preferably lower than or equal to a melting point temperature thereof. Here, the thermal decomposition temperature means that a temperature at which weight decrease starts by thermal decomposition of a sample in measurement using a thermal gravimetric analyzer (TGA).

When the temperature of plasticizing the pressure plastic material is higher than the thermal decomposition temperature of the pressure plastic material in an atmospheric pressure, the pressure plastic material may be degraded, and the durability of the pressure plastic material decreases, a molecular weight of the pressure plastic material decreases due to cutting of a molecular chain thereof, the pressure plastic material is colored or decreases in its transparency due to oxidation thereof, the fixing ability of a toner containing the pressure plastic material decreases, the heat-resistant storage stability of a toner containing the pressure plastic material decreases, the charging ability of a toner containing the pressure plastic material decreases, and energy consumption increases by heat treatment.

<<Particle Forming Step>>

The particle forming step of the method for producing particles of the present invention will be described. The particle forming step is a step of jetting the melt of the pressure plastic material, which is produced in the melting step, to form particles, while a compressive fluid (the second compressive fluid) is supplied to the melt of the pressure plastic material.

First, the compressive fluid (the second compressive fluid, for example, carbon dioxide, etc.) supplied from the bomb 21 is pressurized by the pump 22, and supplied via the valve 23, etc. to be jetted from the nozzle 17. At that time, the compressive fluid is heated with the heater 26 to adjust operation conditions, so that the compressive fluid maintains a constant temperature and pressure. Next, the compressive fluid obtained by mixing in the high pressure cell 14 equipped with a thermostat is melted in a pressure plastic material, so as to obtain a melt of the pressure plastic material. The melt of the pressure plastic material is supplied with the pump 12*b*, passed through the valve 13*b*, and then jetted from the nozzle 17 to atmospheric pressure by taking an advantage of differential pressure. At that time, the pump 12*a*, the back pressure valve 15, and the thermostat, etc. are controlled to maintain the temperature and pressure inside the high pressure cell 14 equipped with a thermostat at constant. The pressure inside the high pressure cell is not particularly limited, and may be equal to the pressure of the compressive fluid supplied from the second path.

Figure 5:
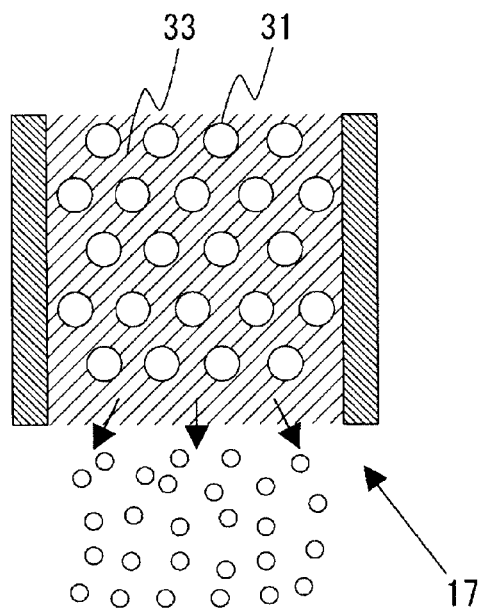
FIG. 5 is a conceptual diagram for explaining a mechanism of jetting fluid from a nozzle of the apparatus for producing particles.

In the particle forming step in the method for producing particles of the present invention, the melt of the pressure plastic material supplied from the first path is jetted with the compressive fluid (carbon dioxide. etc.) supplied from the second path. Thus, the melt 31 supplied from the first path is preliminarily dispersed to have small particles in the compressive fluid 33 supplied from the second path, wherein the melt 31 having a surface boundary with respect to the compressive fluid 33. Therefore, particles produced by jetting can have small diameters (see FIG. 5). Moreover, the solid content concentration of the jetted fluid (a mixture fluid of the melt of the pressure plastic material and the compressive fluid) is decreased, and the fluid to be jetted can achieve to have further low viscosity. Thus, not only the temperature of the fluid can be constantly controlled, but also the jetting speed (outlet linear speed) becomes high. As a result, the nozzle clogging can be prevented, and high shear force is applied to the melt of the pressure plastic material owing to the increase of the outlet linear speed. By virtue of the synergistic effect of low viscosity and low solid content concentration, uniform fine particles without cohesion thereof can be obtained. Moreover, the shape of the resultant particles is uniformly stabilized.

<Apparatus for Producing Particles of Second Embodiment>

An apparatus for producing particles of the second embodiment of the present invention including: a discharging unit configured to discharge a melt of a pressure plastic material, which is produced by brining a compressive fluid into contact with the pressure plastic material; and a particle shape forming section having a space, in which the melt of the pressure plastic material discharged from the discharging unit is formed into particles, wherein the discharging unit includes at least a reservoir for containing the melt of the pressure plastic material, one or more through-holes formed in a part of a wall of the reservoir, and a vibration unit arranged to be in contact with the reservoir so as to apply vibration to the one or more through-holes, and wherein the particle shape forming section includes a pressure control unit configured to control the difference between the pressure of the space and the internal pressure of the reservoir, so as to change the shape of the melt of the pressure plastic material discharged through the one or more through-holes from a columnar shape, through the columnar shape with constrictions, into a particle shape. If necessary, the apparatus for producing particles of the second embodiment of the present invention further includes other units.

Figure 6:
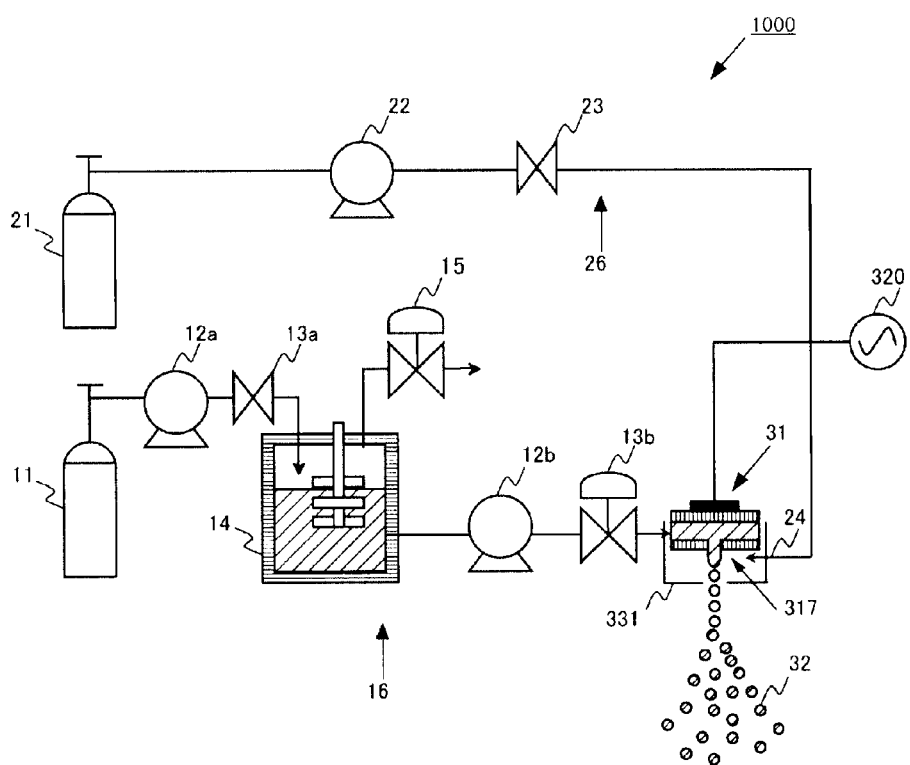
FIG. 6 is another schematic diagram showing an example of the apparatus for producing particles used in the method for producing particles of the present invention.

Next, another example of the apparatus for producing particles used in the method for producing particles of the present invention will be described. FIG. 6 is another schematic diagram showing an example of an apparatus 1000 for producing particles used in the method for producing particles of the present invention. The apparatus 1000 for producing particles includes a melt supply unit 16 configured to supply the melt of the pressure plastic material obtained by bringing the compressive fluid into contact with the pressure plastic material, a discharge device 31 configured to discharge the melt of the pressure plastic material, a particle shape forming section 331 having a space in which the melt of the pressure plastic material discharged from the discharge device 31 is formed into particles. The melt supply unit 16 includes a bomb 11, pumps 12a, 12b, a valve 13a, a high pressure cell 14 equipped with a thermostat, and a back pressure valve 15, which are connected with a super high pressure pipe, etc., so as to form the first path. The particle shape forming section 331 includes a pressure control unit 26, which includes a bomb 21, a pump 22, a valve 23, a supply section 24, which are connected with a super high pressure pipe, etc so as to form the second path. The discharge device 31 is provided with a signal generating device 320, and a through-hole 317.

Next, the melt supply unit 16 will be described. The bomb 11 arranged on the first path is a pressure resistant container for storing and supplying a substance (carbon dioxide, etc.) which will be a compressive fluid in the high pressure cell 14 equipped with a thermostat (hereinafter referred to as "high pressure cell 14"). The substance stored may be in the state of gas, liquid, or the like, as long as the substance is formed into a compressive fluid by controlling the temperature of the substance in the high pressure cell 14 equipped with a thermostat. As the substance stored in the bomb 11, air, nitrogen, and carbon dioxide are preferable, in terms of cost and safety. Among these, carbon dioxide is more preferable. The pump 12a is a device of applying pressure to the substance stored in the bomb 11 so as to supply the substance from the bomb 11. The valve 13a is a device of opening or closing the path between the pump 12a and the high pressure cell 14 equipped with a thermostat, so as to adjust the flow rate of the substance, or to shut off the flow thereof.

The high pressure cell 14 equipped with a thermostat is a device of heating the substance supplied via the valve 13a so as to change it into a compressive fluid, and of bringing the compressive fluid into contact with a pressure plastic material which is separately supplied, so as to produce a melt of the pressure plastic material. The back pressure valve 15 is fixed to the high pressure cell 14 equipped with a thermostat, and is closed or opened to control the pressure in the high pressure cell 14 equipped with a thermostat. Moreover, a stirrer may be provided in the high pressure cell 14 equipped with a thermostat, to thereby stir and mix the compressive fluid and the plasticized pressure plastic material.

The pump 12b is a device of applying a pressure to the melt of the pressure plastic material in the high pressure cell 14 equipped with a thermostat, so as to supply the melt therefrom. The valve 13b is a device of opening or closing the path between the pump 12b and the discharge device 31 so as to control the flow rate of the melt and to shut off the flow thereof. The through-hole 317 is a space, through which the melt supplied from the first path is discharged.

In the apparatus 1000 for producing particles, the bomb 21 arranged on the second path is a pressure resistant container for storing and supplying a second compressive fluid, such as gas, liquid, or the like. As the compressive fluid stored in the bomb 21, air, nitrogen, and carbon dioxide are preferable, in terms of cost and safety. Among these, carbon dioxide is more preferable. The pump 22 is a device of applying pressure to the compressive fluid stored in the bomb 21 so as to supply it from the bomb 21. The valve 23 is a device of opening or closing the path for the compressive fluid between the pump 22 and the discharge device 31, so as to adjust the flow rate of the compressive fluid, or to shut off the flow thereof. Since the compressive fluid supplied from the second path is cooled in the discharge device 31 by Joule-Thompson effect, it is preferred that the substance be sufficiently heated with a heater or the like to be in the supercritical fluid state.

Figure 7:
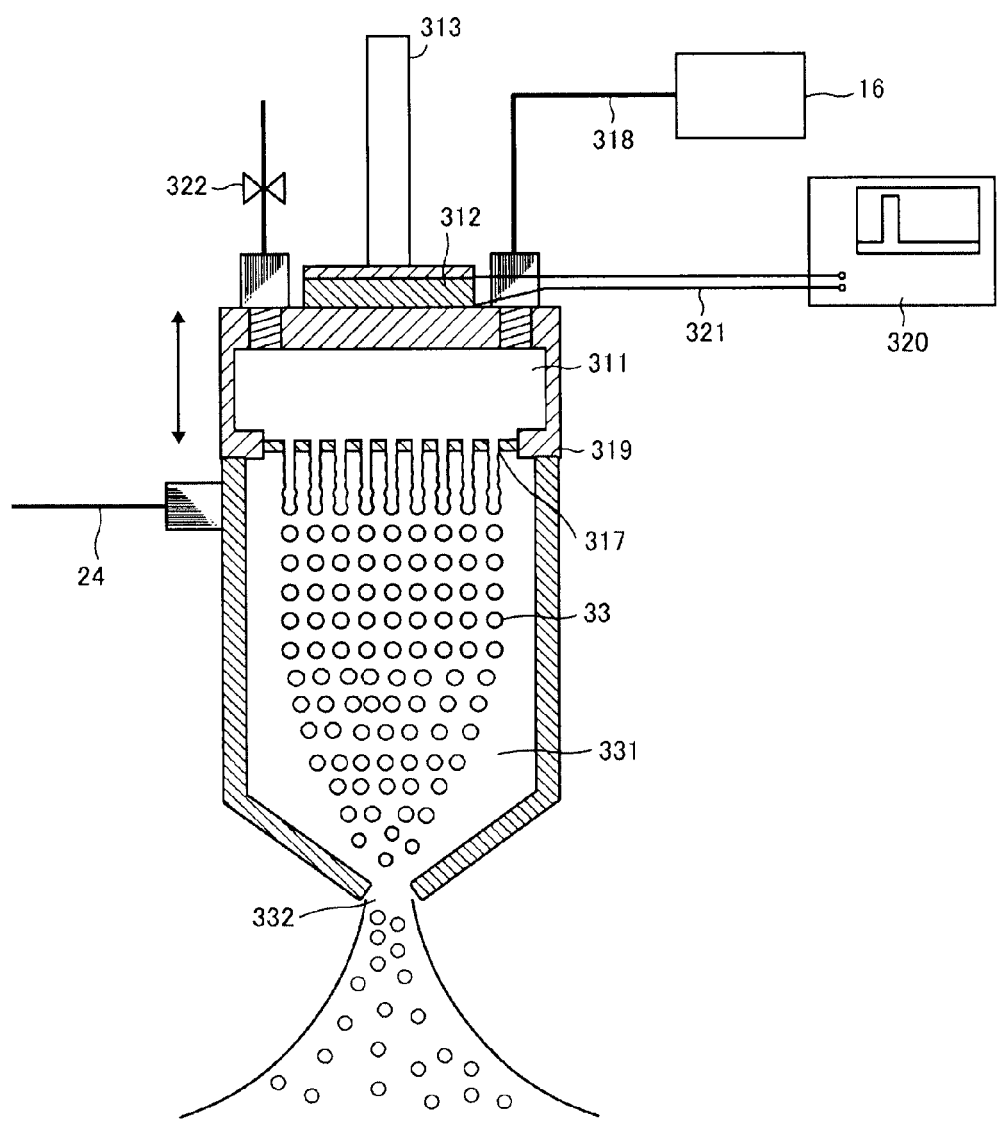
FIG. 7 is a schematic diagram showing an example of a discharge device and particle shape forming section.

Next, with reference to FIG. 7, the discharge device 31 and the particle shape forming section 331 will be described. FIG. 7 is a schematic diagram showing an example of the discharge device 31 and the particle shape forming section 331. Here, a discharge device 31 discharging a toner as an example of particle will be described. The discharge device 31 is not particularly limited and may be appropriately selected depending on the intended purpose, as long as it can discharge particles. The discharge device 31 includes a reservoir 311 for containing the melt of the toner material, one or more through-holes 317 formed in a part of a wall of the reservoir 311, a vibration unit 312 arranged to be in contact with the reservoir 311 for applying vibration to the one or more through-holes 317, a signal generating device 320 connected through the conductive line 321 with the vibration unit 312, and a support unit 313 for supporting the vibration unit 312. In the discharge device 31, the melt of the toner material quantitatively supplied via the valve 13b shown in FIG. 6 to the reservoir 311 is quantitatively discharged to the particle shape forming section 331 through the certain through-hole. In the discharge device 31, one or more through-holes 317 are arranged with respect to one vibration unit 312. The vibration unit 312 is arranged to be in contact with the reservoir 311 for applying vibration to the through-holes 317. Since the discharge device 31 has the above-described structure, in the state that the vibration unit 312 is arranged at normal pressure, the reservoir 311 and the through-holes 317 can be vibrated from outside. Namely, without using a special vibration unit, the melt can be separated into particle shape.

As the discharge device 31, for example, as shown in FIG. 7, it is preferable to use a device having a melt supply unit 16 configured to quantitatively supply the melt of the toner material discharged through the through-hole 317 to the reservoir 311. Hereinafter, each of the units will be specifically described.

<<Reservoir>>

The reservoir 311 and a pipe arrangement connected to the reservoir 311 are formed of metal such as stainless steel (SUS), since the melt of the pressure plastic material is necessary to be kept at high pressure. The pressure resistance is preferably at least approximately 30 MPa. The reservoir 311 is connected with the pipe arrangement 318 for supplying the melt of the pressure plastic material, and preferably has a structure in which a mechanism 319 for maintaining a plate having through-holes 317 is provided. Moreover, the vibration unit 312 configured to apply vibration to the entire reservoir 311 is in contact with the reservoir 311. The vibration unit 312 preferably has an embodiment that the vibration unit 312 is connected though the conductive line 321 with the signal generating device 320, so that vibration is controlled by signal generated by the signal generating device 320. The reservoir 311 preferably has an open valve 322 for controlling the internal pressure of the reservoir 311, so as to stably form the melt of the pressure plastic material in the shape of column (columnar-shaped melt).

<<Vibration Unit>>

The vibration unit 312 is preferably configured to vibrate the entire reservoir 311 including the through-holes 317, in terms of uniform application of vibration. The vibration unit 312 for applying the vibration to the reservoir 311 is not particularly limited and may be appropriately selected depending on the intended purpose, as long as it accurately applies the vibration preferably at a constant number of vibrations (frequency). The vibration unit 312 is preferably a piezoelectric element so as to vibrate the through-holes at a constant frequency owing to telescopic motion, from the standpoint of the above description.

The piezoelectric element has a function to convert the electrical energy to the mechanical energy. Specifically, the piezoelectric element exhibits telescopic motion as the voltage is applied, and this telescopic motion gives the vibrations to the through-holes 317. Examples of a material used for the piezoelectric element include piezoelectric ceramics such as lead zirconate titanate (PZT). Since lead zirconate titanate (PZT) has a small displacement amount, and thus in many cases, it may be used as a laminate structure thereof. Other examples of the material used for piezoelectric element include a piezoelectric polymer such as polyvinylidene fluoride (PVDF), and a single crystal such as crystal quartz, $LiNbO_3$, $LiTaO_3$, or $KnbO_3$.

The frequency of the signal applied to the piezoelectric element is not particularly limited and may be appropriately selected depending on the intended purpose. It is preferably 20 kHz to 10 MHz, more preferably 50 kHz to 1 MHz, from the standpoint of producing minute particles of the melt (also referred to as "particle-shaped melt") having substantially uniform particle diameters. When the frequency of the signal is less than 20 kHz, the productivity tends to decrease. When the frequency of the signal is more than 1 MHz, particle size controllability tends to decrease.

The vibration unit 312 is in contact with the reservoir 311, and the reservoir 311 holds a plate having through-holes 317. The vibration unit 312 is most preferably arranged parallel to the wall of the reservoir 311 on which the through-holes 317 are formed, from the standpoint of uniformly applying vibration to the columnar-shaped melt discharged through the through-holes 317. In the course of applying the vibration, even though the shape of wall of the reservoir is change, the relation between the vibration unit 312 and the wall of the reservoir 311 is preferably the inclination of 10° or less. From the standpoint of improvement of productivity, it is preferred to provide a plurality of the reservoirs 311 each including the vibration unit 312.

The support unit 313 is provided to fix the reservoir 311 and the vibration unit 312 to the discharge device 31. The material of the support unit 313 is not particularly limited as long as it is rigid, such as metal. If necessary, a rubber material, a resin material, and the like as a vibrational relaxation material may be partly provided, so as not to generate disturbance to the vibration of the reservoir caused by excess sympathetic vibration.

<<Through-Hole>>

The through-hole 317 is a space, through which the melt of the pressure plastic material, which is supplied from the first path, is discharged in the shape of column. The material of the member, in which the through-hole 317 is formed, is not particularly limited, and examples thereof include stainless steel (SUS), nickel, copper, aluminum, copper, and titanium. In particular, stainless steel (SUS) and nickel are preferable, in terms of corrosion resistance. The thickness of the member, in which the through-hole 317 is formed, is not particularly limited, but it is preferably 5 µm to 100 µm. When the thickness is more than 100 µm, it is hard to form the through-hole 317 in the member. When the thickness is less than 5 µm, the member may be broken by the differential pressure between the reservoir 311 and the particle shape forming section 331. However, the thickness of the member is not limited to the above-mentioned range, as long as the through-hole 317 can be formed therein, and sufficient durability can be obtained depending on the material of the member.

The opening diameter of the through-hole 317 is not particularly limited, as long as the pressure upon discharging the melt of the pressure plastic material can maintain at constant. When the opening diameter of the through-hole is excessively small, the through-hole 317 is easily clogged with the melt of the pressure plastic material, and it may be difficult to obtain desired fine particles. The maximum value of the opening diameter of the through-hole is not limited, and the minimum value thereof is preferably 2 µm or larger, more preferably 5 µm or larger, particularly preferably 8 µm or larger. Thus, the through-hole 317 is not clogged with dispersions of fine particles each having a diameter of 1 µm or smaller contained in the toner material, and fine particle-shaped melts having substantially uniform diameters can be formed at a set frequency. This is because the range of frequency for stably obtaining the particle-shaped melts as described below decreases, as the diameter of the through-hole substantially becomes large. The opening diameter means a diameter of the through-hole 314 when the shape of the through-hole 314 is circle, and a minor axis of the through-hole 314 when the shape of the through-hole 314 is ellipse. The particle-shaped melt can be produced when only one through-hole 317 is provided. However, from the standpoint of effectively producing the particle-shaped melts having substantially uniform diameters, it is preferred that a plurality of through-holes 317 be provided. The number of the through-holes 317 per one reservoir 311, to which the vibration is applied with one vibration unit 312, is preferably 10 to 10,000 from the standpoint of productivity and controllability, and more preferably 10 to 1,000 in order to surely produce fine particle-shaped melts having substantially uniform diameters. In this case, the productivity of the toner particles is determined from the product of the number (frequency) of the particle-shaped melts produced per unit of time, the number of the vibration unit, and the number of the through-holes operated by one vibration unit 312. From the standpoint of operability, the number of the through-holes 317 operated by one vibration unit 312 is preferably as large as possible, namely, the number of the through-holes 317 included in one reservoir 312 is preferably as large as possible. However, when the number of the through-holes 317 is large without restriction, uniformity of the particle diameters may not be maintained.

Figure 8:
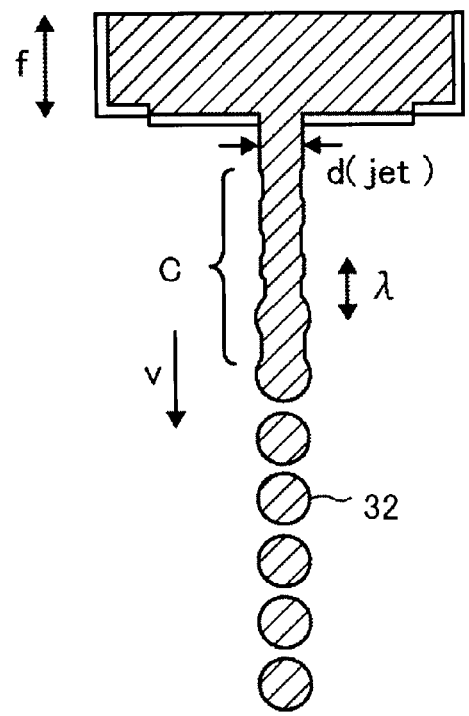
FIG. 8 is an explanatory diagram for explaining a phenomenon of particle shape formation.

Here, the phenomenon that the discharged melt is formed into particles by application of vibration will be described with reference to FIG. 8. FIG. 8 is an explanatory diagram for explaining a phenomenon of particle shape formation. When the melt of the pressure plastic material is discharged through the through-hole by relatively small differential pressure, the melt is discharged in the shape of column immediately after the discharge, and then separated into the melts in the shape of particles. However, in such a method, the particle-shaped melts have random sizes, and the particle-shaped melts generally have broad particle size distribution. Thus, in the present invention, in order to obtain uniform particle-shaped melts, vibration λ at a certain frequency is appropriately applied to the columnar-shaped melt. Thus, the columnar-shaped melt is periodically constricted, and changed its shape to the columnar shape with constrictions (c in FIG. 8), and then formed into particle-shape 32.

In FIG. 8, f denotes number of frequency of the reservoir, d(jet) denotes a diameter of the columnar-shaped melt, and v denotes a velocity of the columnar-shaped melt.

As the phenomenon that a liquid column is formed into uniform liquid droplet, Rayleigh breakup is known. In Rayleigh breakup, the wavelength condition λ at which the liquid column becomes the most unstable is represented by the following formula (1) using the diameter of the liquid droplet d.

$$\lambda = 4.5d \quad (1)$$

The frequency f of the disturbance generated at this time is represented by the following formula (2) where a velocity of the liquid column is expressed by v.

$$f = v/\lambda \quad (2)$$

It has been known that the conditions for producing uniform particles by way of experiment, and confirmed that the uniform particles can be stably formed under the conditions represented by the following formula (3).

$$3.5 < \lambda/d(\text{jet}) < 7.0 \quad (3)$$

It is confirmed that all of the conditions from formulas (1) to (3) come into effect on formation of the columnar-shaped melt into uniform particle-shaped melts in the method for producing particles of the present invention. These conditions are significantly effective to estimate the conditions for obtaining desired particles.

<<Particle Shape Forming Section>>

The particle shape forming section 331 includes a space for applying a certain pressure to the melt of the pressure plastic material discharged through the through-holes 317, and is a member for changing the shape of the melt of the pressure plastic material in the columnar shape to the columnar shape with constrictions, and then into the particle shape. Thus, the particle shape forming section 331 further includes a pressure control unit 26 for controlling the differential pressure between the space and the inside of the reservoir 311 so as to change the shape of the melt discharged through the through-holes 317 from a columnar shape, through the columnar shape with constrictions, into a particle shape. In order to discharge the melt through the through-holes 317, it is necessary that the internal pressure of the reservoir 311 is higher than the pressure in the vicinity of the discharging part of the through-hole, and this differential pressure allows the melt to be discharged through the through-holes 317. However, the melt of the pressure plastic material must be kept in the shape of column until it is formed into the shape of particles, since the melt in the shape of column is constricted by a certain vibration, and then separated into the melt in the shape of particles. Therefore, the pressure near the outside of the through-holes 317, i.e., near the through-holes 317 of the particle shape forming section 331 must not be greatly different from the internal pressure of the reservoir 311. When the differential pressure therebetween is large, the melt of the pressure plastic material is discharged through the through-holes 317 and the pressure is released, and simultaneously the compressive fluid is rapidly evaporated and solidified before the melt is constricted. Consequently, desired particle-shaped melts cannot be obtained. When the differential pressure further increases, the through-holes 317 are broken by the large differential pressure.

Therefore, the structure of the discharge device 31 is not particularly limited, as long as an appropriate differential pressure is generated between the reservoir 311 and near the discharge part of the through-hole 317, i.e, the particle shape forming section 331. As an exemplary structure of the discharge device 31, the reservoir 311 is entirely covered with the particle shape forming section, so as to form double pipe. On the other hand, in view of pressure resistance, when the discharge device 31 is formed of stainless steel (SUS) and needs to be heavy, as shown in FIG. 7, the discharge device 31 more preferably has the structure, in which the particle shape forming section 331 having the same diameter as that of the reservoir 311 is provided next to the reservoir 311, and the second compressive fluid is introduced through the supply section 24 into the particle shape forming section 331 for weight saving. The discharge device 31 is mounted on a top plate with the support unit 313, and applies vibration to the reservoir 311, the through-hole 317, the particle shape forming section 331, and the melt of the toner material simultaneously in a longitudinal direction using the vibration unit 312. Therefore, the supply section 318 of the first path, and the supply section 24 of the second path are movably installed to some extend, so as not to block the vibration applied by the vibration unit 312. The melt of the toner material excessively supplied to the reservoir 311 can be refluxed through the open valve 322, and a valve may be further provided for controlling pressure at the same time as reflux. When the supply amount is the same as the discharge amount, the open valve 322 is closed.

<<Melting Step>>

A melting step of the method for producing particles of the present invention will be described. Here, the melting step will be described with an exemplary case using the apparatus 1000 for producing particles shown in FIG. 6. The melting step of the method for producing particles of the present invention is a step of melting the first compressive fluid in a pressure plastic material, so as to produce a melt of the pressure plastic material. In the present invention, a "melt of the pressure plastic material" (also referred to as "melt") means the expanded, plasticized and liquefied pressure state of the plastic material formed by bringing the pressure plastic material into contact with the compressive fluid. Among rapid expansion processes, a target to be discharged used in a method known as the Rapid Expansion of Supercritical Solutions (RESS) process is formed by dissolving a material as a solute in a compressive fluid, and the fluid is uniformly compatible with the material. On the other hand, the melt of the pressure plastic material, which is a target to be discharged in the rapid expansion process (Particle from Gas Saturated Solutions (PGSS) process) of the present invention is, as described above, obtained by bringing the compressive fluid into contact with the pressure plastic material, followed by wetting, so as to decrease the viscosity of the pressure plastic material. Thus, there is an interface between the compressive fluid and the melt of the pressure plastic material. Namely, the target to be discharged in the former process is in the state of compressive fluid-solid phase equilibrium, on the other hand, the target to be discharged in the latter process is in the state of gas-liquid phase equilibrium. In the rapid expansion processes, the former and the latter are different in phase state of the target to be discharged before expansion.

In the melting step, the pressure plastic material, and materials, such as a colorant when the particles to be produced are toner, are charged into the high pressure cell 14 equipped with a thermostat. In this case, when the materials for the particles include a plurality of materials, these materials may be preliminarily mixed with a mixer, etc., and then melted and kneaded with a roll mill, etc. Next, the high pressure cell 14 equipped with a thermostat is sealed, and then the materials are stirred, and the compressive fluid (the first compressive fluid, for example, carbon dioxide, etc.) supplied from the bomb 11 is pressurized with the pump 12a to supply it via the valve 13a to the high pressure cell 14 equipped with a thermostat. The temperature inside the high pressure cell 14 equipped with a thermostat is adjusted to a certain temperature with the thermostat. The pressure is adjusted to a certain pressured by adjusting the pump 12a, the back pressure valve 15, and the like. This allows the compressive fluid to be in contact with the toner material containing the pressure plastic material. In this case, the compressive fluid is melted in the pressure plastic material, so that the pressure plastic material has low viscosity. The stirring is carried out until the viscosity of the melt of the pressure plastic material becomes constant. The viscosity of the melt of the pressure plastic material or the melt of the toner material is not particularly limited, as long as it can be discharged through the through-holes 317. However, as the viscosity is low, it is easy to make fine particles upon jetting. Thus, the viscosity thereof is preferably 20 mPa·s or lower. When the viscosity of the melt is larger than 20 mPa·s, there is a possibility that particles are hard to be formed, that coarse particles and fibrous products are formed, and that foaming, and cohesion, etc. occur. When a final product is a toner, it may be difficult to produce required uniform fine particles each having a diameter of 4 μm to 8 μm.

A "melt of the toner material" means the state of the entirely melted toner material formed in such a manner that the pressure plastic material is brought into contact with the compressive fluid, so as to expand, plasticize and liquefy the pressure plastic material containing the toner material formed.

In the melting step of the method for producing particles of the present invention, the pressure to be applied to the compressive fluid is not particularly limited and may be suitably selected depending on the intended purpose. It is preferably 1 MPa or more, more preferably 2 MPa to 200 MPa, particularly preferably 5 MPa to 100 MPa. When the pressure to be applied to the compressive fluid is less than 1 MPa, even though a resin is fluidized, the plasticizing effect enough to form particles may not be obtained. The maximum value of the pressure is not particularly limited, and high pressure causes no problem, but the higher the pressure is, the heavier an device becomes, causing increase in cost for equipments.

In the melting step of the method for producing particles in the present invention, a temperature for plasticizing the pressure plastic material is not particularly limited and may be appropriately selected depending on the intended purpose. It is preferably lower than or equal to a thermal decomposition temperature of the pressure plastic material in an atmospheric pressure, and more preferably lower than or equal to a melting point temperature thereof. Here, the thermal decomposition temperature means that a temperature at which weight decrease starts by thermal decomposition of a sample in measurement using a thermal gravimetric analyzer (TGA).

When the temperature of plasticizing the pressure plastic material is higher than the thermal decomposition temperature of the pressure plastic material in an atmospheric pressure, the pressure plastic material may be degraded, and the durability of the pressure plastic material decreases, a molecular weight of the pressure plastic material decreases due to cutting of a molecular chain thereof, the pressure plastic material is colored or decreases in its transparency due to oxidation thereof, the fixing ability of a toner containing the pressure plastic material decreases, the heat-resistant storage stability of a toner containing the pressure plastic material decreases, the charging ability of a toner containing the pressure plastic material decreases, and energy consumption increases by heat treatment.

<<Particle Forming Step>>

The particle forming step of the method for producing particles of the present invention will be described. The particle forming step is a step of discharging the melt of the pressure plastic material produced in the melting step through the through-hole, to which vibration is applied.

First, the compressive fluid (the second compressive fluid, for example, carbon dioxide, etc.) supplied from the bomb 21 is pressurized by the pump 22, and supplied via the valve 23, etc. to be discharged from an opening 332 through the supply section 24, etc. At that time, the compressive fluid is heated with the heater to adjust operation conditions, so that the compressive fluid maintains a constant temperature and pressure. Next, the compressive fluid obtained by mixing in the high pressure cell 14 equipped with a thermostat is melted in a pressure plastic material, so as to obtain a melt of the pressure plastic material. The melt of the pressure plastic material is supplied with the pump 12b, passed through the valve 13b, and then discharged through the through-holes 317 by taking an advantage of differential pressure. At that time, the pump 12a, the back pressure valve 15, and the thermostat, etc. are controlled to maintain the temperature and pressure inside the high pressure cell 14 equipped with a thermostat at constant. The pressure inside the high pressure cell is not particularly limited, and may be equal to the pressure of the compressive fluid supplied from the second path.

As described above, the melt of the pressure plastic material in the reservoir 311 is discharged to the space of the particle shape forming section 331, in which the pressure is maintained so that the melt of the pressure plastic material immediately after discharged through the through-holes 317 can be formed into the columnar-shaped melt. Thereafter, by means of the vibration through the reservoir 311, the columnar-shaped melt is constricted, and the constricted portion of the columnar-shaped melt is converted into the particle-shaped melts 32 through Rayleigh breakup.

The pressure in the space of the particle shape forming section 331 is not particularly limited and may be appropriately determined in view of the viscosity, and the discharge pressure, etc. of the melt to be discharged, as long as the melt can be discharged through the through-holes 317. For example, when the viscosity of the melt is 3 mPa·s, the reservoir 311 is approximately 65 MPa, thus, the pressure of the particle shape forming section 331 is less than 65 MPa. Moreover, in view of the discharge speed, the difference between the internal pressure of the reservoir 311 and the pressure of the area near the reservoir 311 in the particle shape forming section 331 is 500 kPa or less, preferably 200 kPa or less. To maintain the differential pressure between the inside of the reservoir 311 and the area near the reservoir 311 in the particle shape forming section 331 at the above-mentioned value, the pressure of the melt of the pressure plastic material supplied from the first path and the pressure of the second compressive fluid supplied from the second path are respectively controlled. These conditions significantly differ depending on the total length of the particle shape forming section 331, and the diameter of the opening 332 provided in the bottom of the discharge device 31. For example, even when the pressure of the melt of the pressure plastic material supplied from the first path is equal to the pressure of the second compressive fluid supplied from the second path, the pressure inside the particle shape forming section decreases, since the pressure is released through the opening 332 to the atmospheric pressure. Thus, the pressure inside the particle shape forming section 331 becomes lower than the internal pressure of the reservoir 311. Thus, when the differential pressure becomes extremely large depending on the device structure, the pressure is controlled to make the pressure of the second compressive fluid supplied from the second path larger than the pressure of the melt of the pressure plastic material supplied from the first path, to thereby obtain an optimal differential pressure. Since the pressure hardly varies with time, operation can be continued at a constant pressure. A method of monitoring the pressure of the particle forming section 331, followed by feed back controlling is effective in terms of device maintenance. Since the pressure rapidly decreases, the particle-shaped melts formed in the particle shape forming section 331 is completely solidified in the bottom of the particle shape forming section 331 or after released into the atmosphere, to thereby prevent aggregation of particles. Moreover, the melt of the pressure plastic material is rapidly discharged from the opening 332 by the differential pressure, and released to a free space, to thereby form complete toner particles. Owing to Rayleigh breakup of the columnar-shaped melt, excellent particle controllability and unity of the particles can be obtained, and particle-shaped melts can be effectively prevented from aggregation by rapid solidification, to thereby obtain a toner having outstandingly sharp particle size distribution.

<Toner>

The toner used in the present invention is produced by the method for producing particles of the present invention. The shape, size, and the like of the toner are not particularly limited and may be appropriately determined depending on the intended purpose. The toner preferably has the following image density, average circularity, volume average particle diameter, ratio of volume average particle diameter to number average particle diameter (volume average particle diameter/number average particle diameter), etc.

The image density is preferably 1.90 or more, more preferably 2.00 or more, particularly preferably 2.10 or more, as determined using a spectrometer (X-Rite 938 Spectrodensitometer, manufactured by X-Rite, Incorporated). When the image density is less than 1.90, the image density is low and high quality image may not be obtained. The image density is measured as follows. Using IMAGIO NEO 450 (manufactured by Ricoh Company, Ltd.), a solid image is formed, with a toner-adhesion amount of 1.00 mg/cm$^2$±0.05 mg/cm$^2$, on copying paper TYPE 6000 <70W> (manufactured by Ricoh Company, Ltd.), while the surface temperature of the fixing roller being controlled to 160° C.±2° C. Image densities of arbitrarily selected six portions of the formed solid image are measured using a spectrometer (X-Rite 938 Spectrodensitometer, manufactured by X-Rite, Incorporated) to determine the average image density.

The average circularity is a value that the circumferential length of a circle that has an equivalent shape and an equivalent projected area to those of the toner is divided by the circumferential length of an actual particle, and not particularly limited and may be appropriately selected depending on the intended purpose. For example, the average circularity is preferably 0.900 to 0.980 and more preferably 0.950 to 0.975. Note that a toner containing 15% or less of particles that have an average circularity of less than 0.94 is preferable. When the average circularity is less than 0.900, a high-quality image having satisfiable transferring property and causing no dust may not be obtained, and when more than 0.980, in an image forming system using blade cleaning technique, cleaning defects occur on the photoconductor and the transfer belt in the system, image smear, for example, in a case of formation of an image having a high-image area ratio such as photographic image, a toner forming an untransferred image due to a paper-feeding defect or the like accumulates on the photoconductor remains an untransferred toner thereon, and the untransferred toner may cause background smear on images, or a charging roller etc. that contact-charges the photoconductor is contaminated with the untransferred toner, thereby the toner may not exert its intrinsic charging ability.

The average circularity of toner particles can be measured using, for example, the flow particle image analyzer FPIA-2000, manufactured by To a Medical Electronics Co., Ltd. In the measurement, fine dust is removed from water using a filter, such that the number of particles inside a measured area (for example, 0.60 μm or larger but smaller than 159.21 μm in circle equivalent diameter) in 10$^{-3}$ cm$^3$ of the water is 20 or fewer, then a few drops of a nonionic surfactant (preferably, CONTAMINON N, manufactured by Wako Pure Chemical Industries, Ltd.) are added into 10 mL of the water. Then 5 mg of a measurement sample is further added in the water, dispersion is carried out for 1 minute under conditions of 20 kHz and 50 W/10 cm$^3$ using the ultrasonic dispersing apparatus UH-50 (manufactured by SMT Co., Ltd.), dispersion is further carried out for a total of 5 minutes, and the particle size distribution of particles which are 0.60 μm or larger but smaller than 159.21 μm in circle equivalent diameter is measured using a sample dispersion liquid in which the measurement sample has a particle concentration of 4,000 number/10$^{-3}$ cm$^3$ to 8,000 number/10$^{-3}$ cm$^3$ (when particles belonging to the measurement circle equivalent diameter range are targeted).

The sample dispersion liquid is passed through a flow path (which widens with respect to the flow direction) of a flat, transparent flow cell (approximately 200 μm in thickness). To form an optical path which advances intersecting the thickness of the flow cell, a strobe and a CCD camera are provided so as to be positioned oppositely to each other with respect to the flow cell. A strobe light is emitted at intervals of 1/30 seconds to obtain images of particles flowing in the flow cell; as a result, the particles are photographed as two-dimensional images having certain areas which are parallel to the flow cell. Based upon the areas of the two-dimensional images of the particles, the diameters of circles having the same areas are calculated as circle equivalent diameters.

The circle equivalent diameters of 1,200 or more particles can be measured in approximately 1 minute, and the number of particles based upon the distribution of the circle equivalent diameters, and the proportion (number %) of particles having a prescribed circle equivalent diameter can be measured. The results (frequent % and cumulative %) can be obtained dividing the range of 0.06 μm to 400 μm into 226 channels (one octave is divided into 30 channels). The practical measurement of particles is carried out concerning particles which are 0.60 μm or lager but smaller than 159.21 μm in circle equivalent diameter.

The volume average particle diameter of the toner is not particularly limited and may be appropriately selected depending on the intended purpose. It is preferably 3 μm to 10 μm, more preferably 3 μm to 8 μm. When the toner having a volume average particle diameter of less than 3 μm is used in a two-component developer, the toner may fuse and adhere to the carrier surface during long-term stirring in the developing device to thereby decrease charging ability of the carrier. On the other hand, when the toner having a volume average particle diameter of less than 3 μm is used in a one-component developer, the toner may tend to invite filming to a developing roller or adhesion to another member such as blade by thinning the toner layer. When the volume average particle diameter is more than 10 μm, the toner may not sufficiently yield high-quality images with a high resolution and may often show large variation in its particle diameter after consumption and addition of the toner in the developer.

The ratio Dv/Dn of the volume average particle diameter (Dv) to the number average particle diameter (Dn) in the toner is preferably 1.00 to 1.25, more preferably 1.00 to 1.10. When the ratio (Dv/Dn) of the volume average particle diameter to the number average particle diameter is more than 1.25, in the case of a two-component developer, the toner fuses and adheres to the carrier surface during long-term stirring in the developing device to thereby decrease the charging ability of the carrier, and in the case of a one-component developer, the toner may tend to invite filming to the developing roller or adhesion to another member such as blade by thinning the toner layer. Moreover, the toner may not sufficiently yield high-quality images with a high resolution and may often show large variation in its particle diameter after consumption and addition of the toner in the developer.

The volume average particle diameter, and the ratio Dv/Dn of the volume average particle diameter to the number average particle diameter can be measured, for example, using a particle size analyzer Coulter Counter TA-II (manufactured by Beckman Coulter, Inc.).

In the present invention, the toner material does not substantially contain an organic solvent. In the present invention, a toner can be produced using the toner material containing no organic solvent, since the compressive fluid is used. Thus, a toner containing substantially no organic solvent can be produced. Note that "containing substantially no organic solvent" means that the amount of the organic solvent in the toner measured by the following measurement method is detection limit or lower.

<Measurement Method of Residual Solvent>

The amount of the residual solvent of the toner can be measured by the following measurement method. To 1 part by mass of a toner to be measured, 2 parts by mass of 2-propanol is added, and dispersed by ultrasonic wave for 30 minutes, and then the mixture is stored in a refrigerator at 5° C. for 1 day or longer, to thereby extract a solvent in the toner. A supernatant liquid is analyzed by gas chromatography (GC-14A, manufactured by Shimadzu Corporation), to determine the amount of the solvent and a residual monomer in the toner. Thus, the concentration of the solvent is measured. The measurement conditions for such analysis is as follows.

Device: Shimadzu GC-14A
Column: CBP20-M 50-0.25
Detector: FID
Injection volume: 1 μL to 5 μL
Carrier gas: He 2.5 kg/cm$^2$
Flow rate of hydrogen: 0.6 kg/cm$^2$
Flow rate of air: 0.5 kg/cm$^2$
Chart speed: 5 mm/min
Sensitivity: Range 101×Atten 20
Column temperature: 40° C.
Injection temperature: 150° C.

<Developer>

The developer used in the present invention contains at least the toner used the present invention, and may further contain appropriately selected other components such as a carrier. The developer may be, for example, a one-component developer, or a two-component developer. When used in, for example, high-speed printers which respond to increase in the recent information processing speed, it is preferably used as a two-component developer from the viewpoint of elongating its service life.

When the developer is a one-component developer using the toner, the developer involves less change in diameter of each toner particle, no toner filming on a developing roller and no toner adhesion on a member, such as a blade, for forming a thin toner layer. Thus, even when used (stirred) in a developing device for a long period of time, the developer maintains stable, excellent developability and image. Also, when the developer is a two-component developer using the toner, the developer involves less change in diameter of each toner particle in the developer even after long-term repetitive cycles of consumption and addition thereof. Thus, even when stirred in a developing device for a long period of time, the developer maintains stable, excellent developability.

—Carrier—

The carrier is not particularly limited and may be appropriately selected depending on the intended purpose. Nevertheless, preference is given to a carrier including a core material, and a resin layer that covers the core material.

The material for the core material is not particularly limited and may be appropriately selected from materials known in the art. For example, manganese-strontium (Mn—Sr) materials (50 emu/g to 90 emu/g) and manganese-magnesium (Mn—Mg) materials (50 emu/g to 90 emu/g) are preferable. In terms of securing appropriate image density, highly magnetized materials such as iron powder (100 emu/g or greater) and magnetite (75 emu/g to 120 emu/g) are preferable. In terms of the fact that the contact force on a photoconductor, where toner particles are disposed in an upright position, can be reduced and image quality can be advantageously improved, weakly magnetized materials such as copper-zinc (Cu—Zn) materials (30 emu/g to 80 emu/g) are preferable. These may be used alone or in combination.

The particle diameter of the core material as a volume average particle diameter is preferably 10 μm to 150 μm, more preferably 40 μm to 100 μm. When the average particle diameter (volume average particle diameter ($D_{50}$)) is less than 10 μm, the amount of fine powder increases in the distribution of carrier particles, and this increase causes a decrease in magnetization per particle and thus possibly causes scattering of the carrier. Here, "$D_{50}$" is also called a median diameter, and means a diameter of particles by which the particles are divided into two groups, and an amount of the large group and an amount of the small group are equal. When the volume average particle diameter ($D_{50}$) is greater than 150 μm, the specific surface area of the carrier particles decreases, possibly causing scattering of the toner, and possibly degrading reproduction of solid portions in the case of full-color images that contain plenty of solid portions.

The material for the resin layer is not particularly limited and may be appropriately selected from resins known in the art, depending on the intended purpose. Examples thereof include amino resins, polyvinyl resins, polystyrene resins, halogenated olefin resins, polyester resins, polycarbonate resins, polyethylene resins, polyvinyl fluoride resins, polyvinylidene fluoride resins, polytrifluoroethylene resins, polyhexafluoropropylene resins, copolymers of vinylidene fluoride and acrylic monomers, copolymers of vinylidene fluoride and vinyl fluoride, fluoroterpolymers (fluorinated triple (multiple) copolymers) such as a terpolymer composed of tetrafluoroethylene, vinylidene fluoride and a nonfluorinated monomer, and silicone resins. These may be used alone or in combination.

The amino resins include urea-formaldehyde resins, melamine resins, benzoguanamine resins, urea resins, polyamide resins, and epoxy resins. Examples of the polyvinyl resins include acrylic resins, polymethyl methacrylate resins, polyacrylonitrile resins, polyvinyl acetate resins, polyvinyl alcohol resins, and polyvinyl butyral resins. Examples of the polystyrene resins include polystyrene resins, and styrene-acrylic copolymers. Examples of the halogenated olefin resins include polyvinyl chloride. The polyester resins include polyethylene terephthalate resins, and a polybutylene terephthalate resins.

If necessary, the resin layer that covers the core material may contain conductive powder, etc. Examples of the conductive powder include metal powder, carbon blacks, titanium oxide, tin oxide and zinc oxide. The average particle diameter of any of these conductive powders is preferably 1 μm or less. When the average particle diameter is greater than 1 μm, it may be difficult to control electric resistance.

The resin layer that covers the core material can, for example, be formed by dissolving a silicone resin, etc. in a solvent so as to prepare a coating solution, then uniformly applying the coating solution over the surface of the core material by a coating method known in the art, which is followed by drying, and subsequently firing the dried coating solution. Examples of the coating method include immersion, spraying, and coating with the use of a brush. The solvent is not particularly limited and may be appropriately selected depending on the intended purpose. Examples thereof include toluene, xylene, methyl ethyl ketone, methyl isobutyl ketone, cellosolve and butyl acetate. The firing of the resin layer is not particularly limited and may be based upon external heating or internal heating. For example, the firing may be carried out in accordance with a method using a stationary electric furnace, a fluid-type electric furnace, a rotary electric furnace, a burner furnace, etc., or a method using a microwave.

The amount of the resin layer contained in the carrier is preferably 0.01% by mass to 5.0% by mass. When the amount is less than 0.01% by mass, it may be impossible to uniformly form the resin layer over the surface of the core material. When the amount is greater than 5.0% by mass, the resin layer is so thick that granulation among carrier particles occurs, possibly failing to obtain uniform carrier particles.

In the case where the developer is a two-component developer, the amount of the carrier contained in the two-component developer is not particularly limited and may be appropriately selected depending on the intended purpose. The amount of the carrier is preferably 90% by mass to 98% by mass, more preferably 93% by mass to 97% by mass.

Since the developer contains the toner of the present invention, the developer is excellent in charging ability and can stably form high quality images upon image formation.

The developer is suitably used for image formation by various known electrophotography, such as a magnetic one-component developing method, a non-magnetic one-component developing method, and a two-component developing method.

<Process Cartridge>

A process cartridge used in the present invention includes at least a latent electrostatic image bearing member configured to support a latent electrostatic image and a developing unit configured to develop a latent electrostatic image borne on the latent electrostatic image bearing member using a toner to form a visible image, and further includes other units appropriately selected as necessary.

The process cartridge can be detachably attached to an image forming apparatus body, and is excellent in convenience. The developing unit includes at least a developer container configured to contain the toner and/or developer of the present invention and a developer bearing member configured to bear and convey the toner and/or developer contained in the developer container, and may further include a layer thickness control member configured to control the layer thickness of the toner to be borne on the developer bearing member, as necessary.

Figure 9:
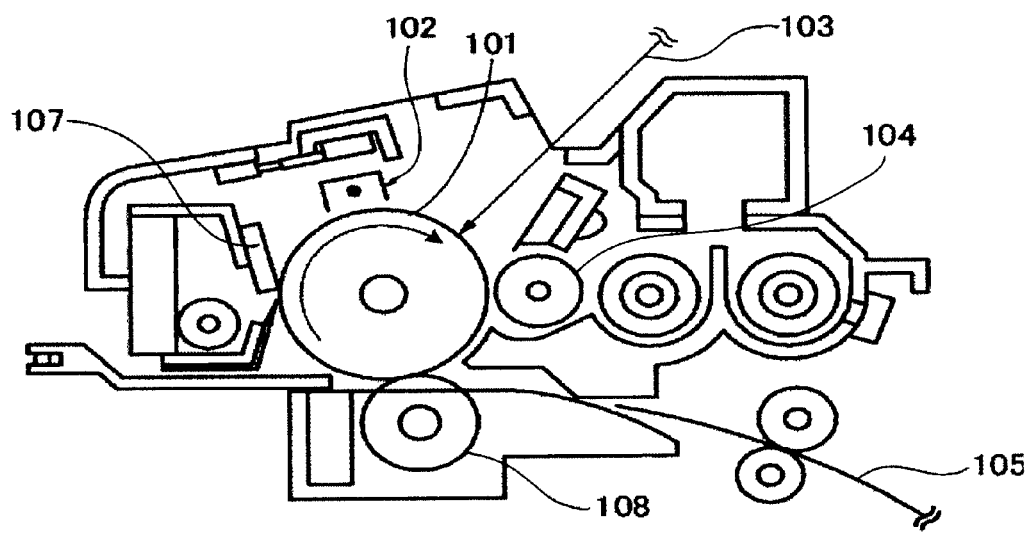
FIG. 9 is a schematic diagram showing an example of a process cartridge of the present invention.

Here, the process cartridge will be specifically described with reference to FIG. 9. FIG. 9 is a schematic diagram showing an example of a process cartridge used in the present invention. The process cartridge, for example, as shown in FIG. 9, houses a latent electrostatic image bearing member (photoconductor) 101, includes a charging unit 102, a developing unit 104, a transferring unit 108, and a cleaning unit 107, and further includes other members as necessary. In FIG. 9, reference numeral 103 denotes exposure by an exposing unit, and reference numeral 105 denotes a recording medium.

Next, an image forming process conducted by the process cartridge of FIG. 9 will be described. While the latent electrostatic image bearing member 101 rotates in the arrow direction, a latent electrostatic image corresponding to an exposure image is formed on the surface of the photoconductor by charging by the charging unit 102 and exposure 103 by the exposing unit (not shown). This latent electrostatic image is developed using a toner by the developing unit 104, and the developed visible image is transferred by the transferring unit 108 to the recording medium 105. Subsequently, after the image is transferred to the recording medium the surface of the latent electrostatic image bearing member is cleaned by the cleaning unit 107, and is further charge eliminated by a charge eliminating unit (not shown), and the above operations are repeated.

<Image Forming Method and Image Forming Apparatus>

An image forming method used in the present invention includes at least a latent electrostatic image forming step, a developing step, a transferring step, and a fixing step, and further includes appropriately selected other steps, for example, a charge eliminating step, a cleaning step, a recycling step, a controlling step, and the like, if necessary.

An image forming apparatus used in the present invention includes at least a latent electrostatic image bearing member, a latent electrostatic image forming unit, a developing unit, a transferring unit, and a fixing unit, and further includes appropriately selected other units, for example, a charge eliminating unit, a cleaning unit, a recycling unit, a controlling unit, and the like, if necessary.

<<Latent Electrostatic Image Forming Step and Latent Electrostatic Image Forming Unit>>

The latent electrostatic image forming step is a step of forming a latent electrostatic image on the latent electrostatic image bearing member. The latent electrostatic image bearing member (also referred to as "electrophotographic photoconductor" or "photoconductor") is not particularly limited in material, shape, structure, size, and the like, and may be appropriately selected from known ones. The shape is preferably a drum shape, and examples of the material include inorganic photoconductors such as amorphous silicon and selenium; and organic photoconductors such as polysilane and phthalopolymethine. Of these, amorphous silicon or the like is preferable from the standpoint of a long life span.

The latent electrostatic image may be formed by uniformly charging the surface of the latent electrostatic image bearing member and then exposing its surface imagewise by the latent electrostatic image forming unit. The latent electrostatic image forming unit includes at least, for example, a charger that uniformly charges the surface of the is latent electrostatic image bearing member and an exposing device that exposes the surface of the latent electrostatic image bearing member imagewise.

The charger uniformly charges the surface of f the latent electrostatic image bearing member by applying voltage to the surface of the latent electrostatic image bearing member. The charger is not particularly limited and may be appropriately selected depending on the intended purpose. Examples thereof include a contact charger which is known by itself provided with a conductive or semiconductive roll, brush, film, rubber blade, or the like, and a noncontact charger using a corona discharge such as a corotron or scorotron.

The exposure may be carried out by exposing the surface of the latent electrostatic image bearing member imagewise by use of the exposing device. The exposing device is not particularly limited as long as it is capable of exposing imagewise on the surface of the latent electrostatic image bearing member which has been charged by the charger and may be appropriately selected depending on the intended purpose. Examples thereof include various exposing devices such as a copying optical system, a rod lens array system, a laser optical system, and a liquid crystal shutter optical system. In the present invention, a backlight system for exposing the latent electrostatic image bearing member imagewise from the rear surface side may be employed.

<<Developing Step and Developing Unit>>

The developing step is a step of developing the latent electrostatic image using the toner and/or developer produced by the method for producing the toner of the present invention so as to form a visible image.

The visible image may be formed by developing the latent electrostatic image using the toner and/or developer by the developing unit.

The developing unit is not particularly limited, as long as it is capable of developing using the toner and/or developer and may be appropriately selected from known ones. For example, one that includes at least a developing device that contains the toner and/or developer and is capable of supplying the toner and/or developer to the latent electrostatic image in a contact or noncontact manner is preferable, and a developing device equipped with the toner container is more preferable.

The developing device may employ either a dry developing system or a wet developing system, and may be either a single-color developing device or a multi-color developing device. Examples thereof include one including a stirrer that frictionally stirs the toner and/or developer so as to be charged and a rotatable magnet roller.

In the developing device, for example, the toner and the carrier are mixed and stirred, the toner is charged by friction at that time and is held in an upright position on the surface of the rotating magnet roller to form a magnetic brush. Since the magnet roller is arranged in the vicinity of the latent electrostatic image bearing member (photoconductor), a part of the toner constituting the magnetic brush formed on the surface of the magnet roller is moved to the surface of the latent electrostatic image bearing member (photoconductor) by an electrical suction force. As a result, the latent electrostatic image is developed with the toner to form a visible toner image on the surface of the latent electrostatic image bearing member (photoconductor).

The developer contained in the developer container is a developer containing the toner. The developer may be a one-component developer or a two-component developer.

<<Transferring Step and Transferring Unit>>

The transferring step is a step of transferring the visible image to a recording medium. It is preferable to primarily transfer the visible image onto the intermediate transfer medium using an intermediate transfer medium, and then secondarily transfer the visible image onto the recording medium, and it is more preferable that the transferring step includes a primary transfer step of transferring the visible image onto the intermediate transfer medium to form a composite transfer image using toners of two or more colors, preferably, full-color toner, and a secondary transfer step of transferring the composite transfer image onto a recording medium.

The transfer is carried out by, for example, charging the visible image onto the latent electrostatic image bearing member (photoconductor) using a transfer charger. The transferring unit preferably includes a primary transferring unit configured to transfer the visible image onto the intermediate transfer medium to form a composite transfer image and a secondary transferring unit configured to transfer the composite transfer image onto the recording medium. The intermediate transfer medium is not particularly limited and may be appropriately selected from ones known depending on the intended purpose, and examples thereof include a transfer belt.

The transferring unit (the primary transferring unit and the secondary transferring unit) preferably includes at least a transfer device that separates and charges the visible image formed on the latent electrostatic image bearing member (photoconductor) onto the recording medium side. One or a plurality of transferring units may be provided. Examples of the transferring unit include a corona transfer device using corona discharge, a transfer belt, a transfer roller, a pressure transfer roller, and an adhesion transfer device.

Here, the recording medium is not particularly limited and may be appropriately selected from known recording media (recording paper).

<<Fixing Step and Fixing Unit>>

The fixing step is a step of fixing the transferred visible image onto the recording medium using a fixing device, and this may be carried out for toners of respective colors every time these are transferred to the recording medium or may be simultaneously carried out for the toners of respective colors in a laminated state at a time. The fixing unit is not particularly limited and may be appropriately selected depending on the intended purpose, for example, a known heating pressure unit is preferably used. Examples of the heating pressure units include a combination of a heating roller and a pressure roller, and a combination of a heating roller, a pressure roller and an endless belt. Usually, heating by the heating pressure unit is preferably at 80° C. to 200° C. In the present invention, for example, a known optical fixing device may be used in combination with the fixing step and fixing unit or in place of these, depending on the intended purpose.

<<Other Steps and Other Units>>

—Charge Eliminating Step and Charge Eliminating Unit—

The charge eliminating step is a step of charge eliminating by applying a charge eliminating bias to the latent electrostatic image bearing member by a charge eliminating unit. The charge eliminating unit is not particularly limited as long as it can apply a charge eliminating bias to the latent electrostatic image bearing member, and may be appropriately selected from known charge eliminating devices. Examples thereof include charge eliminating lamps.

—Cleaning Step and Cleaning Unit—

The cleaning step is a step of removing the toner remaining on the latent electrostatic image bearing member and preferably carried out by a cleaning unit. The cleaning unit is not particularly limited as long as it can remove the toner remaining on the latent electrostatic image bearing member, and may be appropriately selected from known cleaners. Examples thereof include a magnetic brush cleaner, an electrostatic brush cleaner, a magnetic roller cleaner, a blade cleaner, a brush cleaner, and a web cleaner.

—Recycling Step and Recycling Unit—

The recycling step is a step of recycling the toner removed by the cleaning step to the developing unit, and can be preferably carried out by a recycling unit. The recycling unit is not particularly limited and may be appropriately selected from known conveying units.

—Controlling Step and Controlling Unit—

The controlling step is a step of controlling the respective steps, and can be preferably controlled by a controlling unit. The controlling unit is not particularly limited as long as it is capable of controlling operations of the respective units, and may be appropriately selected depending on the intended purpose. Examples thereof include devices such as sequencers and computers.

Figure 10:
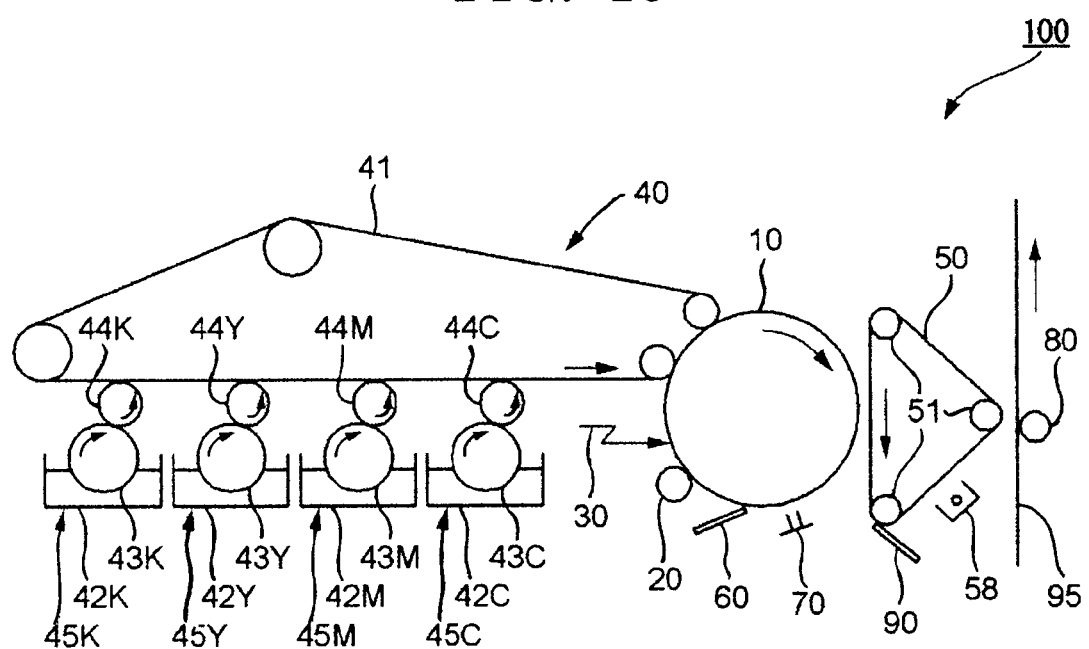
FIG. 10 is a schematic diagram showing an example of an image forming apparatus used in the image forming method of the present invention.

Hereinafter, an example of the image forming method is carried out by the image forming apparatus used in the present invention will be explained with reference to FIG. 10. FIG. 10 is a schematic diagram showing an example of an image forming apparatus used in the image forming method used in the present invention. An image forming apparatus 100 as shown in FIG. 10 includes a photoconductor drum 10 (hereinafter, referred to as photoconductor 10) serving as the latent electrostatic image bearing member, a charging roller 20 serving as the charging unit, exposure 30 by means of an exposing device serving as the exposing unit, a developing device 40 serving as the developing unit, an intermediate transfer medium 50, a cleaning device 60 serving as the cleaning unit having a cleaning blade, and a charge eliminating lamp 70 serving as the charge eliminating unit.

The intermediate transfer medium 50 is an endless belt, which is stretched around three rollers 51 so as to be movable in the arrow direction in FIG. 10. A part of the three rollers 51 also functions as a transfer bias roller that is capable of applying a predetermined transfer bias (primary transfer bias) to the intermediate transfer medium 50. For the intermediate transfer medium 50, arranged in the vicinity thereof is a cleaning blade 90 for the intermediate transfer medium, and arranged opposing thereto is a transfer roller 80 serving as the transferring unit capable of applying a transfer bias to transfer (secondary transfer) a visible image (toner image) onto a recording medium 95. Around the intermediate transfer medium 50, arranged is a corona charger 58 for applying a charge to the visible image on the intermediate transfer medium 50, in the rotating direction of the intermediate transfer medium 50, between a contact portion between the photoconductor 10 and the intermediate transfer medium 50 and a contact portion between the intermediate transfer medium 50 and the recording medium 95.

The developing device 40 consists of a developing belt 41 serving as the developer bearing member and a black developing unit 45K, a yellow developing unit 45Y, a magenta developing unit 45M, and a cyan developing unit 45C provided side by side around the developing belt 41. The black developing unit 45K includes a developer containing portion 42K, a developer feed roller 43K, and a developing roller 44K. The yellow developing unit 45Y includes a developer containing portion 42Y, a developer feed roller 43Y, and a developing roller 44Y. The magenta developing unit 45M includes a developer containing portion 42M, a developer feed roller 43M, and a developing roller 44M. The cyan developing unit 45C includes a developer containing portion 42C, a developer feed roller 43C, and a developing roller 44C. In addition, the developing belt 41 is an endless belt, which is rotatably stretched around a plurality of belt rollers and a part of which contacts with the photoconductor 10.

In the image forming apparatus 100 as shown in FIG. 10, for example, the charging roller 20 uniformly charges the photoconductor drum 10. The exposing device carries out exposure 30 imagewise on the photoconductor drum 10 to form a latent electrostatic image. The latent electrostatic image formed on the photoconductor drum 10 is developed by feeding a toner from the developing device 40 to form a visible image (toner image). The visible image (toner image) is transferred (primary transfer) onto the intermediate transfer medium 50 by a voltage applied from the rollers 51 and is further transferred (secondary transfer) onto the recording medium 95. As a result, a transfer image is formed on the recording medium 95. Here, a residual toner on the photoconductor 10 is removed by the cleaning device 60, and charging on the photoconductor 10 is once removed by the charge eliminating lamp 70.

Since the toner of the present invention having a sharp particle size distribution and excellent toner properties (e.g., charging properties, environmental impact, and temporal stability) is used in the image forming method and the image forming apparatus of the present invention, high-quality images can be formed.

<<Supplement to Embodiment>>

In the above embodiments, the case that the apparatus for producing particles used in the method for producing particles is the apparatus 1 or 1000 for producing particles shown in FIGS. 4 and 6 is described, but the present invention is not limited thereto. In this case, common jetting devices used in Particles from Gas Saturated Solutions (PGSS) process can be used.

In the above embodiments, the case of jetting the melt containing the pressure plastic material and the compressive fluid into the atmosphere is described, but the present invention is not limited thereto. In this case, the melt can be jetted into the environment having a pressure higher than atmosphere and lower than the pressure inside the high pressure cell 14 equipped with a thermostat. Thus, by controlling the jetting speed (outlet linear speed), the controllability of particle size or particle size distribution can be enhanced, and heating by heater can be suppressed with respect to the cooling by Joule-Thompson effect, to thereby achieve energy saving, and low cost.

EXAMPLES

Hereinafter, Examples of the present invention will be specifically explained, which should not be construed to limit the present invention. All part(s) and % are expressed by mass unless indicated otherwise.

Synthesis Example 1

—Synthesis of Polyester Resin(Pressure Plastic Resin)—

Into a reaction vessel equipped with a condenser, a stirrer and a nitrogen inlet tube, 229 parts of an ethylene oxide (2 mol) adduct of bisphenol A, 529 parts of a propylene oxide (3 mol) adduct of bisphenol A, 208 parts of terephthalic acid, 46 parts of adipic acid and 2 parts of dibutyltin oxide were charged, and reacted under normal pressure at 230° C. for 8 hours. Next, the reaction system was reacted under reduced pressure of 10 mmHg to 15 mmHg for 5 hours, and then 44 parts of trimellitic anhydride was added into the reaction vessel and further reacted under normal pressure at 180° C. for 2 hours to thereby obtain Polyester Resin 1. The resultant Polyester Resin 1 had a number average molecular weight Mn of 2,500, a weight average molecular weight Mw of 6,700, a glass transition temperature of 43° C., and an acid value of 25 mgKOH/g, and the inclination in the graph showing the relation between the pressure and the glass transition temperature was −10° C./MPa.

Synthesis Example 2

—Synthesis of Crystalline Polyester Resin—

Into a 5 L four-neck flask equipped with a nitrogen inlet tube, a dehydration tube, a stirrer and a thermocouple, 25 mole of 1,4-butanediol, 23.75 mole of fumaric acid, 1.65 mole of trimellitic anhydride and 5.3 g of hydroquinone were charged, and reacted at 160° C. for 5 hours, and the reaction product was further reacted at 200° C. for 1 hour. Furthermore, the resultant product was reacted at 8.3 kPa for 1 hour, to thereby synthesize Crystalline Polyester Resin 1. The resultant Crystalline Polyester Resin 1 had a melting point of 119° C., a number average molecular weight Mn of 710, a weight average molecular weight Mw of 2,100, an acid value of 24 mgKOH/g and a hydroxyl value of 28 mgKOH/g.

Example A1

| Toner Material | |
|---|---|
| Polyester Resin 1 of Synthesis Example 1 | 95 parts |
| colorant (copper phthalocyanine blue) | 5 parts |
| paraffin wax (melting point: 79° C.) | 5 parts |

The toner material was mixed with a mixture, and melted and kneaded with a two-roll mill, and then the kneaded product was rolled and cooled. This kneaded product was placed in a high pressure cell 14 equipped with a thermostat of an apparatus 1 for producing particles shown in FIGS. 4 and 5, and carbon dioxide as supercritical fluid was introduced therein so that the carbon dioxide became 130° C. and 65 MPa, and then the mixture was stirred for 1 hour, so as to obtain a melt of the pressure plastic material. The resultant melt (melt of the toner material) had a viscosity of 3 mPa·s. The viscosity of the melt was measured with a viscometer, VISCOlab PVT (manufactured by Cambridge Viscosity, Inc.). The measurement was performed as follows: a sample was placed in a measurement section, followed by controlling temperature and pressure, and the viscosity of the sample at the controlled temperature and pressure was determined when the viscosity became substantially constant. Next, a valve 23 was opened, and the supercritical carbon dioxide was jetted from a nozzle 17, while keeping the supercritical carbon dioxide at 135° C. and 65 MPa using a pump 22 and a heater 26. In this state, a valve 13b was opened to operate a pump 12b, so as to jet the melt, to thereby obtain Toner A1. At that time, by adjusting the pump 12a and the back pressure valve 15, the temperature of 130° C. and the pressure of 65 MPa inside the high pressure cell 14 equipped with a thermostat were maintained at constant. The resultant toner particles had a volume average particle diameter Dv of 5.1 µm, a number average particle diameter Dn of 4.5 µm, and Dv/Dn of 1.13.

Examples A2 to A12 and Comparative Examples A1 to A4

Toners A2 to A12 and Comparative Toners A1 to A4 were produced in the same manner as in Example A1, except that the treatment temperature and the treatment pressure in the high pressure cell upon jetting were changed to the values shown in Table A1.

Regarding Comparative Toners A1 to A4, particles could not be formed, because the melt of the toner material could not be sufficiently plasticized. The measurement results of the volume average particle diameters Dv and the number average particle diameters Dn of Toners A2 to A12 are shown in Table A1.

Example A13

Toner A13 was produced in the same manner as in Example A1, except that 5 parts of Crystalline Polyester Resin 1 of Synthesis Example 2 was further added in the toner material. The measurement results of the volume average particle diameter Dv and the number average particle diameter Dn of Toner A13 are shown in Table A1.

Comparative Example A5

Comparative Toner A5 was produced in the same manner as in Example A1, except that the valve 23 was closed and that the pump 22 was not used. The measurement results of the volume average particle diameter Dv and the number average particle diameter Dn of Comparative Toner A5 are shown in Table A1.

TABLE A1

| | Toner No. | treatment temperature °C. | treatment pressure MPa | viscosity of melt of pressure plastic material mPa·s | volume average particle diameter Dv μm | number average particle diameter Dn μm | Dv/Dn |
|---|---|---|---|---|---|---|---|
| Ex. A1 | A1 | 130 | 65 | 3 | 5.1 | 4.5 | 1.13 |
| Ex. A2 | A2 | 130 | 70 | 2 | 5.0 | 4.5 | 1.11 |
| Ex. A3 | A3 | 130 | 40 | 9 | 5.3 | 4.6 | 1.15 |
| Ex. A4 | A4 | 110 | 35 | 20 | 7.8 | 6.0 | 1.30 |
| Ex. A5 | A5 | 110 | 70 | 5 | 5.9 | 5.0 | 1.18 |
| Ex. A6 | A6 | 100 | 60 | 10 | 6.5 | 5.7 | 1.14 |
| Ex. A7 | A7 | 80 | 70 | 9 | 5.7 | 5.1 | 1.12 |
| Ex. A8 | A8 | 150 | 35 | 18 | 8.4 | 6.8 | 1.24 |
| Ex. A9 | A9 | 150 | 70 | 2 | 4.8 | 4.3 | 1.12 |
| Ex. A10 | A10 | 180 | 31 | 20 | 9.2 | 7.1 | 1.30 |
| Ex. A11 | A11 | 100 | 30 | 22 | 32.5 | 6.9 | 4.71 |
| Ex. A12 | A12 | 100 | 29 | 25 | 57.6 | 8.1 | 7.11 |
| Ex. A13 | A13 | 130 | 65 | 2 | 5.0 | 4.5 | 1.11 |
| Comp. Ex. A1 | Comparative Toner A1 | 150 | 0.1 | 5,800 | Particles could not be formed. | Particles could not be formed. | — |
| Comp. Ex. A2 | Comparative Toner A2 | 150 | 8 | 650 | Particles could not be formed. | Particles could not be formed. | — |
| Comp. Ex. A3 | Comparative Toner A3 | 130 | 8 | 850 | Particles could not be formed. | Particles could not be formed. | — |
| Comp. Ex. A4 | Comparative Toner A4 | 130 | 20 | 65 | Particles could not be formed. | Particles could not be formed. | — |
| Comp. Ex. A5 | Comparative Toner A5 | 130 | 65 | 3 | 18.4 | 5.3 | 3.47 |

To 100 parts of each of the resultant toners (Toners A1 to A10 and A13, Comparative Toner A5), 0.7 parts of hydrophobic silica and 0.3 parts of hydrophobized titanium oxide were added and mixed using a HENSCHEL MIXER at a circumferential speed of 8 m/s for 5 minutes. The mixed powder was passed through 100 μm-aperture mesh to remove coarse particles. The toner (5%) treated with an external additive and 95% of a silicone resin-coated cupper-zinc ferrite carrier having an average particle diameter of 40 μm were uniformly mixed and charged with a TURBULA MIXER in which a vessel was rolled for stirring so as to prepare each of two-component Developers A1 to A10 and A13, and Comparative Developer A1. Note that the toners each used in Developers A1 to A10 and A13, and Comparative Developer A1 respectively corresponded to Toners A1 to A10 and A13, and Comparative Toner A5. With regard to Comparative Toners A1 to A4 and Toners A11 and A12, the two-component developers thereof were not prepared.

To 100 parts of each of the resultant toners (Toners A1 to A10 and A13, Comparative Toner A5), 0.7 parts of hydrophobic silica and 0.3 parts of hydrophobized titanium oxide were added and mixed using a HENSCHEL MIXER at a circumferential speed of 8 m/s for 5 minutes, so as to prepare each of one-component Developers A21 to A30 and A33, and Comparative Developer A2. Note that the toners each used in Developers A21 to A30 and A33, and Comparative Developer A2 respectively corresponded to Toners A1 to A10 and A13, and Comparative Toner A5. With regard to Comparative Toners A1 to A4 and Toners A11 and A12, the one-component developers thereof were not prepared.

The two-component Developers A1 to A10 and A13, Comparative Developer A1, the one-component Developers A21 to A30 and A33, and Comparative Developer A2 were charged in an image forming apparatus, and images were printed, and evaluated in the following manner. Note that as the image forming apparatus, IPSIO COLOR 8100 manufactured by Ricoh Company, Ltd. was used for evaluation of the two-component developer, and IMAGIO NEO C200 manufactured by Ricoh Company, Ltd. was used for evaluation of the one-component developer. The results are shown in Table A2.

<Image Density>

Using each developer, a solid image was output on plain transfer paper (Type 6200, manufactured by Ricoh Company, Ltd.), with the low adhesion amount of the developer being 0.3 mg/cm±0.1 mg/cm$^2$, and then the image density was measured using X-Rite (manufactured by X-Rite).

Evaluation Criteria

A: Image density was 1.4 or more.
B: Image density was 1.35 or more but less than 1.4.
C: Image density was 1.3 or more but less than 1.35.
D: Image density was less than 1.3.

<Cleaning Ability>

A residual toner on a photoconductor just after cleaned was transferred onto white paper using a SCOTCH TAPE (manufactured by Sumitomo 3M Limited) after 1,000 sheets of a chart having an image area of 95% were output. The density of the white paper was measured using Macbeth reflection densitometer RD514. The difference between the obtained value and the blank value was calculated, and the cleaning performance was evaluated according to the following evaluation criteria.

Evaluation Criteria

A: The difference was less than 0.005.
B: The difference was 0.005 to 0.010.
C: The difference was more than 0.010 but 0.02 or less.
D: The difference was more than 0.02.

<Toner Scattering>

After 100,000 sheets of a chart having an image area of 5% were continuously output using each of toners in an image forming apparatus (IPSIO COLOR 8100, manufactured by Ricoh Company, Ltd.), which had been converted to oilless fixing system and tuned for evaluation, at a temperature of 40° C. and 90% RH, the level of toner contamination in the image forming apparatus was visually observed and evaluated based on the following evaluation criteria.

Evaluation Criteria

A: No toner contamination was observed at all in the image forming apparatus, and an excellent state was maintained.
B: Slight toner contamination was observed in the image forming apparatus, and a satisfactory state was maintained.

C: Toner contamination was observed in the image forming apparatus.

D: Severe toner contamination was observed in the image forming apparatus, and it was far from the practical level.

<Transferability>

A residual toner on a photoconductor just before cleaning was transferred onto white paper using a SCOTCH TAPE (manufactured by Sumitomo 3M Ltd.) after a chart having an image area of 20% was transferred from the photoconductor to paper. The density of the white paper was measured using Macbeth Reflection Densitometer RD514. The difference between the obtained value and the blank value was calculated, and the cleaning performance was evaluated according to the following evaluation criteria.

Evaluation Criteria
  A: The difference was less than 0.005.
  B: The difference was 0.005 to 0.010.
  C: The difference was more than 0.010 but 0.02 or less.
  D: The difference was more than 0.02.

<Charge Stability>

The endurance test of 100,000 sheets continuous output was performed using each of toners and a character and image pattern having an image area of 12%, and change of charge amount in the endurance test was evaluated. A small amount of the developer was taken from a sleeve, and the change of the charge amount was found by the blowoff method and evaluated based on the following evaluation criteria.

Evaluation Criteria
  A: Change of the charge amount was less than 5 μc/g.
  B: Change of the charge amount was 5 μc/g to 10 μc/g.
  C: Change of the charge amount was more than 10 μc/g.

<Filming>

After 1,000 sheets of respective band charts having image areas of 100%, 75% and 50% were output, the filming over a developing roller and photoconductor were visually observed and evaluated based on the following evaluation criteria.

Evaluation Criteria
  A: No filming occurred.
  B: Filming slightly occurred.
  C: Streaky filming occurred.
  D: Filming occurred all over the developing roller and photoconductor.

<Comprehensive Evaluation>

In the evaluation results of each evaluation item, A, B, C and D were respectively rated as point 1, point 0, point −1 and point −2, and the points of each developer were counted up for Comprehensive Evaluation.

Evaluation Criteria
  A: Total point was 4 to 5.
  B: Total point was 0 to 3.
  C: Total point was −3 to 1.
  D: Total point was −4 or smaller.

TABLE A2

| | Image Density | Toner Scattering | Transferability | Charge Stability | Filming | Cleaning Ability | Comprehensive Evaluation |
|---|---|---|---|---|---|---|---|
| Developer A1 | A | A | A | B | A | B | A |
| Developer A2 | A | A | A | B | A | A | A |
| Developer A3 | A | A | A | B | B | B | A |
| Developer A4 | B | B | B | B | A | B | B |
| Developer A5 | A | A | A | B | B | A | A |
| Developer A6 | B | A | A | B | B | B | B |
| Developer A7 | A | A | B | B | A | A | A |
| Developer A8 | B | B | B | B | A | B | B |
| Developer A9 | A | A | A | B | A | A | A |
| Developer A10 | B | B | B | B | B | B | B |
| Developer A13 | A | A | A | A | A | A | A |
| Comparative Developer A1 | C | C | C | B | B | B | B |
| Developer A21 | A | A | A | B | A | B | A |
| Developer A22 | A | A | A | B | A | A | A |
| Developer A23 | A | A | A | B | B | B | A |
| Developer A24 | B | B | B | B | B | B | B |
| Developer A25 | A | A | A | B | B | A | A |
| Developer A26 | B | A | A | B | B | B | B |
| Developer A27 | A | A | B | B | A | A | A |
| Developer A28 | B | B | B | B | B | B | B |
| Developer A29 | A | A | A | B | A | A | A |
| Developer A30 | B | B | B | B | B | B | B |
| Developer A33 | A | A | A | A | A | A | A |
| Comparative Developer A2 | C | C | C | B | B | B | B |

Example B1

| Toner Material | |
|---|---|
| Polyester Resin 1 of Synthesis Example 1 | 95 parts |
| colorant (copper phthalocyanine blue) | 5 parts |
| paraffin wax (melting point: 79° C.) | 5 parts |

The toner material was mixed with a mixture, and melted and kneaded with a two-roll mill, and then the kneaded product was rolled and cooled. This kneaded product was placed in a high pressure cell 14 equipped with a thermostat of an apparatus 1000 for producing particles shown in FIGS. 6 and 7, and carbon dioxide as supercritical fluid was introduced therein so that the carbon dioxide became 130° C. and 65 MPa, and then the mixture was stirred for 1 hour, so as to obtain a melt of the pressure plastic material. The resultant melt (melt of the toner material) had a viscosity of 3 mPa·s. The viscosity of the melt was measured with a viscometer, VISCOlab PVT (manufactured by Cambridge Viscosity, Inc.). The measurement was performed as follows: a sample was placed in a measurement section, followed by controlling temperature and pressure, and the viscosity of the sample at the controlled temperature and pressure was determined when the viscosity became substantially constant. Next, a valve 23 was opened, and the supercritical carbon dioxide was kept at 135° C. and 65 MPa using a pump 22 and a heater (not shown), and introduced into a particle shape forming section 331 of a discharge device 31. In this state, a valve 13b was opened to operate a pump 12b, so as to introduce the melt of the toner material into a reservoir 311 of the discharge device 31. Moreover, using a signal generating device 320, sine wave of alternating current frequency 320 kHz is applied to a vibration unit 312 consisting of a laminating PZT, to vibrate the discharge device 31, to thereby form particle-shaped melts. The resultant particle-shaped melts are solidified in atmospheric pressure, to thereby obtain a desired Toner B1. In this case, it was confirmed by stroboscopic microscopy that the discharged melt of the pressure plastic material in the columnar shape changed its shape to the columnar shape with constrictions, and then was formed into the particle shape. One hundred through-holes 317 each having a diameter of 8.0 μm were formed in a houndstooth check pattern in a stainless steel (SUS) plate having a thickness of 50 μm. At that time, by adjusting the pump 12a and the back pressure valve 15, the temperature of 130° C. and the pressure of 65 MPa inside the high pressure cell 14 equipped with a thermostat were maintained at constant. Moreover, by adjusting the open valve 322, the difference between the internal pressure of the reservoir 311 and the pressure of the area near the reservoir 311 in the particle shape forming section 331 was controlled to 80 kPa±50 kPa. The resultant toner particles had a volume average particle diameter Dv of 5.02 μm, a number average particle diameter Dn of 4.91 μm, and Dv/Dn of 1.02. In Examples, the volume average particle diameter Dv and the number average particle diameter Dn were measured using a particle size analyzer Coulter Counter TA-II (manufactured by Beckman Coulter, Inc.).

<Observation of Shape Variation of Melt of Pressure Plastic Material by Stroboscopic Microscopy>

The shape variation of the melt of the pressure plastic material was observed by so-called stroboscopic microscopy. According to this method, in order to observe the vicinity of a through-hole 317 from the side surface, a pressure-resistant quartz glass in the shape of a circle having 1 cm-diameter was provided on a side surface of a wall 319 of the particle shape forming section, and the shape variation of the melt right after passing through the through-hole 317 was observed. A light emitting diode (LED) light was arranged in a position where the vicinity of the through-hole 317 could be irradiated with the LED light at an angle of 30 degrees with respect to the front face of the quartz glass. The LED light flashed in synchronization with the signal generating device 320 which applied vibration to the melt. Moreover, a high-sensitive CCD camera was placed in the front of the glass for displaying the shape variation. When the shape variation of the melt occurred in synchronization with the cycle of flashing the LED light, the shape of the melt was clearly displayed on the monitor through the camera. When the shape variation of the melt did not occur in synchronization with the cycle, the shape of the melt was blurry displayed on the monitor. Therefore, when a columnar-shaped melt was formed by application of a constant vibration, followed by changing its shape to the columnar shape with constrictions, and then the melt was periodically formed into particle shape, the variation shown in FIG. 8 was conformed by observation through the camera. When the melt of the pressure plastic material randomly changed its shape without forming into a columnar shape, the resulting image of the pressure plastic material is blurred so that the columnar-shaped melt and the particle-shaped melt were not confirmed by observation through the camera.

Examples B2 to B8

Toners B2 to B8 were produced in the same manner as in Example B1, except that the diameter of the through-hole 317, the frequency, and the treatment temperature and the treatment pressure inside the high pressure cell 14 upon discharging were changed to the values shown in Table B1. In this case, it was confirmed by the stroboscopic microscopy that the discharged melt of the pressure plastic material in the columnar shape changed its shape to the columnar shape with constrictions, and then was formed into the particle shape. The measurement results of the volume average particle diameters Dv and the number average particle diameters Dn of Toners B2 to B8 are shown in Table B1.

Example B9

Toner B9 was produced in the same manner as in Example B1, except that 5 parts of Crystalline Polyester Resin 1 of Synthesis Example 2 was further added in the toner material. In this case, it was confirmed by the stroboscopic microscopy that the discharged melt of the pressure plastic material in the columnar shape changed its shape to the columnar shape with constrictions, and then was formed into the particle shape. The measurement results of the volume average particle diameter Dv and the number average particle diameter Dn of Toner B9 are shown in Table B1.

Comparative Example B1

Comparative Toner B1 was produced in the same manner as in Example B1, except that by turning off the power source of the signal generating device 320 no vibration was applied to produce the toner. In this case, it could not be confirmed by the stroboscopic microscopy that the discharged melt of the pressure plastic material in the columnar shape changed its shape to the columnar shape with constrictions, and then was formed into the particle shape. The resultant particles of Comparative Toner B1 had a broad particle size distribution, and Comparative Toner B1 had a volume average particle diameter Dv of 7.83 μm, a number average particle diameter Dn of 4.32 μm, and Dv/Dn of 1.81.

Comparative Example B2

Comparative Toner B2 was produced in the same manner as in Example B1, except that the toner was produced at an atmospheric pressure without introducing the compressive fluid (carbon dioxide) in the particle shape forming section 331 of the discharge device 31 by closing the valve 23. In this case, the valve 13b was opened to move the pump 12b, and at the moment when the melt of the toner material was introduced, a metal plate, in which the through-holes 317 were formed, was broken. Therefore, the pressure of the reservoir 311 could not be maintained, and the toner could not be obtained.

Comparative Example B3

Comparative Toner B3 was produced in the same manner as in Example B1, except that the valve 322 was regulated to control the difference between the internal pressure of the reservoir 311 and the pressure of the area near the reservoir 311 in the particle shape forming section 331 at 750 kPa±100 kPa. In this case, it could not be confirmed by the stroboscopic microscopy that the discharged melt of the pressure plastic material in the columnar shape changed its shape to the columnar shape with constrictions, and then was formed into the particle shape. The resultant particles of Comparative Toner B3 had a broad particle size distribution, and Comparative Toner B3 had a volume average particle diameter Dv of 6.32 μm, a number average particle diameter Dn of 4.64 μm, and Dv/Dn of 1.66.

TABLE B1

| Toner No. | treatment temperature °C. | treatment pressure MPa | viscosity of melt of the pressure plastic material mPa·s | diameter of through-hole μm | frequency KHz | volume average particle diameter Dv μm | number average particle diameter Dn μm | Dv/Dn |
|---|---|---|---|---|---|---|---|---|
| Ex. B1 | B1 | 130 | 65 | 3 | 8.0 | 320 | 5.02 | 4.91 | 1.02 |
| Ex. B2 | B2 | 130 | 65 | 3 | 7.5 | 320 | 4.70 | 4.60 | 1.02 |
| Ex. B3 | B3 | 130 | 65 | 3 | 7.0 | 320 | 4.40 | 4.27 | 1.03 |
| Ex. B4 | B4 | 130 | 65 | 3 | 8.0 | 480 | 4.65 | 4.43 | 1.05 |
| Ex. B5 | B5 | 130 | 65 | 3 | 8.0 | 160 | 5.34 | 5.18 | 1.03 |
| Ex. B6 | B6 | 130 | 70 | 2 | 8.0 | 320 | 5.09 | 4.99 | 1.02 |
| Ex. B7 | B7 | 110 | 70 | 5 | 8.0 | 320 | 5.33 | 5.08 | 1.05 |
| Ex. B8 | B8 | 80 | 70 | 9 | 8.0 | 320 | 5.87 | 5.54 | 1.06 |
| Ex. B9 | B9 | 130 | 65 | 2 | 8.0 | 320 | 4.99 | 4.90 | 1.02 |
| Comp. Ex. B1 | Comparative Toner B1 | 130 | 65 | 3 | 8.0 | — | 7.83 | 4.32 | 1.81 |
| Comp. Ex. B2 | — | 130 | 65 | 3 | 8.0 | 320 | — | — | — |
| Comp. Ex. B3 | Comparative Toner B3 | 130 | 65 | 3 | 8.0 | 320 | 6.32 | 4.64 | 1.66 |

To 100 parts of each of the resultant toners (Toners B1 to B8 and B9, Comparative Toners B1 and B3), 0.7 parts of hydrophobic silica and 0.3 parts of hydrophobized titanium oxide were added and mixed using a HENSCHEL MIXER at a circumferential speed of 8 m/s for 5 minutes. The mixed powder was passed through 100 μm-aperture mesh to remove coarse particles. The toner (5%) treated with an external additive and 95% of a silicone resin-coated copper-zinc ferrite carrier having an average particle diameter of 40 μm were uniformly mixed and charged with a TURBULA MIXER in which a vessel was rolled for stirring so as to prepare each of two-component Developers B1 to B8 and B9, and Comparative Developers B1 and B3. Note that the toners each used in Developers B1 to B8 and B9, and Comparative Developers B1 and B3 respectively corresponded to Toners B1 to B8 and B9, and Comparative Toners B1 and B3.

To 100 parts of each of the resultant toners (Toners B1 to B8 and B9, Comparative Toners B1 and B3), 0.7 parts of hydrophobic silica and 0.3 parts of hydrophobized titanium oxide were added and mixed using a HENSCHEL MIXER at a circumferential speed of 8 m/s for 5 minutes, so as to prepare each of one-component Developers B10 to B17 and B18, and Comparative Developers B4 and B6. Note that the toners each used in Developers B10 to B17 and B18, and Comparative Developers B4 and B6 respectively corresponded to Toners B1 to B8 and B9, and Comparative Toners B1 and B3.

The resultant Developers B1 to B8, B9, B10 to B17 and B18, and Comparative Developers B1, B3, B4 and B6 were charged in an image forming apparatus, and images were printed, and then the properties of Developers were evaluated in the same manner as in the two-component Developers A1 to A10, A13 and Comparative Developer A1, the one-component Developers A21 to A30 and A33, and Comparative Developer A2. Note that as the image forming apparatus, IPSIO COLOR 8100 manufactured by Ricoh Company, Ltd. was used for evaluation of the two-component developer, and IMAGIO NEO C200 manufactured by Ricoh Company, Ltd. was used for evaluation of the one-component developer. The results are shown in Table B2.

TABLE B2

| | Image Density | Toner Scattering | Transferability | Charge Stability | Filming | Cleaning Ability | Comprehensive Evaluation |
|---|---|---|---|---|---|---|---|
| Developer B1 | A | A | A | A | A | A | A |
| Developer B2 | A | B | A | B | A | B | B |
| Developer B3 | B | B | B | B | B | B | B |
| Developer B4 | A | A | A | B | A | A | A |
| Developer B5 | A | B | B | B | A | A | B |
| Developer B6 | A | A | A | B | A | A | A |
| Developer B7 | A | B | B | B | A | A | B |
| Developer B8 | A | B | B | B | A | B | B |
| Developer B9 | A | A | A | B | B | A | A |
| Comparative Developer B1 | B | D | C | B | B | D | D |
| Comparative Developer B3 | B | D | C | B | B | D | D |
| Developer B10 | A | B | A | B | A | A | A |
| Developer B11 | A | B | A | B | A | B | B |
| Developer B12 | B | B | B | B | B | B | B |
| Developer B13 | A | B | A | B | A | A | A |
| Developer B14 | A | B | B | B | A | A | B |
| Developer B15 | A | B | A | B | A | A | A |
| Developer B16 | A | B | B | B | A | A | B |
| Developer B17 | A | B | B | B | A | B | B |
| Developer B18 | A | B | A | B | B | A | B |

TABLE B2-continued

|  | Image Density | Toner Scattering | Transferability | Charge Stability | Filming | Cleaning Ability | Comprehensive Evaluation |
|---|---|---|---|---|---|---|---|
| Comparative Developer B4 | C | D | C | C | B | D | D |
| Comparative Developer B6 | C | D | C | C | B | D | D |

This application claims priorities to Japanese patent application Nos. 2010-247532, filed on Nov. 4, 2010, and 2010-267703, filed on Nov. 30, 2010, and incorporated herein by reference.

What is claimed is:

1. A method for producing particles, comprising:
bringing a compressive fluid into contact with a pressure plastic material, so as to produce a melt of the pressure plastic material; and
discharging the melt of the pressure plastic material by differential pressure to a space, so as to form particles, wherein the discharging comprises at least one of
(A) discharging the melt of the pressure plastic material while a compressive fluid is supplied to the melt of the pressure plastic material, and
(B) discharging the melt of the pressure plastic material through one or more through-holes, to which vibration is applied, so as to change the shape of the melt of the pressure plastic material from a columnar shape, through the columnar shape with constrictions, into a particle shape.

2. The method for producing particles according to claim 1, wherein the melt has a viscosity of 20 mPa·s or lower.

3. The method for producing particles according to claim 1, wherein the pressure plastic material is at least one selected from a group consisting of a polyester resin, a vinyl resin, and a urethane resin.

4. The method for producing particles according to claim 1, wherein the compressive fluid comprises any one of supercritical carbon dioxide and liquefied carbon dioxide.

5. The method for producing particles according to claim 1, wherein the particles are toner particles.

6. An apparatus for producing particles, comprising:
a particle forming unit configured to discharge a melt of a pressure plastic material, which is produced by bringing a compressive fluid into contact with the pressure plastic material, by differential pressure to a space, so as to form particles,
wherein the particle forming unit comprises at least one of
(A) a discharging unit configured to discharge the melt of the pressure plastic material while a compressive fluid is supplied to the melt of the pressure plastic material, and
(B) a reservoir for containing the melt of the pressure plastic material, one or more through-holes formed in a part of a wall of the reservoir, and a vibration unit arranged to be in contact with the reservoir so as to apply vibration to the one or more through-holes.

* * * * *